US012610151B2

(12) United States Patent
Cheung et al.

(10) Patent No.: US 12,610,151 B2
(45) Date of Patent: Apr. 21, 2026

(54) SYNCHRONIZATION CIRCUITRY FOR REDUCING LATENCY ASSOCIATED WITH IMAGE PASSTHROUGH

(71) Applicant: Apple Inc., Cupertino, CA (US)

(72) Inventors: Joseph Cheung, San Jose, CA (US);
Kaushik Raghunath, Pleasanton, CA (US); Michael Bekerman, Los Gatos, CA (US); Moinul H. Khan, San Jose, CA (US); Vivaan Bahl, Palo Alto, CA (US); Yung-Chin Chen, Saratoga, CA (US); Yuqing Su, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 18/369,399

(22) Filed: Sep. 18, 2023

(65) Prior Publication Data

US 2024/0107183 A1     Mar. 28, 2024

Related U.S. Application Data

(60) Provisional application No. 63/409,357, filed on Sep. 23, 2022.

(51) Int. Cl.
*H04N 23/86* (2023.01)
*H04N 23/60* (2023.01)
*H04N 23/83* (2023.01)

(52) U.S. Cl.
CPC ........... *H04N 23/86* (2023.01); *H04N 23/665* (2023.01); *H04N 23/83* (2023.01)

(58) Field of Classification Search
CPC ...... H04N 23/86; H04N 23/665; H04N 23/83;
G09G 5/377; G09G 2310/08; G09G 2340/0435; G09G 2360/144; G09G 2360/18; G09G 5/363; G09G 5/12
See application file for complete search history.

(56) References Cited

U.S. PATENT DOCUMENTS

| | | | |
|---|---|---|---|
| 9,230,504 B2 | 1/2016 | Kim et al. | |
| 9,526,080 B2 | 12/2016 | Khait et al. | |
| 10,152,775 B1 * | 12/2018 | Bellows ................... | G06T 5/80 |
| 10,748,340 B1 | 8/2020 | Zhang et al. | |

(Continued)

OTHER PUBLICATIONS

PCT International Search Report and Written Opinion dated Jan. 18, 2024, PCT International Application No. PCT/ US2023/033003, pp. 1-20.

*Primary Examiner* — Gevell V Selby
(74) *Attorney, Agent, or Firm* — Fernando & Partners, LLP

(57) ABSTRACT

In some implementations, a method of synchronizing a content generation and delivery architecture to reduce the latency associated with image passthrough. The method includes: determining a temporal offset associated with the content generation and delivery architecture to reduce a photon-to-photon latency across the content generation and delivery architecture; obtaining a first reference rate associated with a portion of the content generation and delivery architecture; generating, via synchronization circuitry, a synchronization signal for the content generation and delivery architecture based at least in part on the first reference rate; and operating the content generation and delivery architecture according to the synchronization signal and the temporal offset.

23 Claims, 21 Drawing Sheets

(56) References Cited

U.S. PATENT DOCUMENTS

| | | | |
|---|---|---|---|
| 2015/0194128 A1* | 7/2015 | Hicok | H04N 23/63 |
| | | | 345/592 |
| 2016/0328882 A1 | 11/2016 | Lee et al. | |
| 2019/0174123 A1 | 6/2019 | Munro | |
| 2020/0029015 A1* | 1/2020 | Kawai | H04N 23/665 |

\* cited by examiner

200

Image Capture Device Latency 202

Image Capture Device Readout Latency 204

ISP Pipeline Latency 205

Display Pipeline Latency 206

Display Device Latency 208

Time (ms)

Photon-to-photon Latency 210

| Photo-to-photon Latency 210 | Jitter Delay 212 | Misc. Temporal Padding 214 |
|---|---|---|

Temporal Offset 112

600

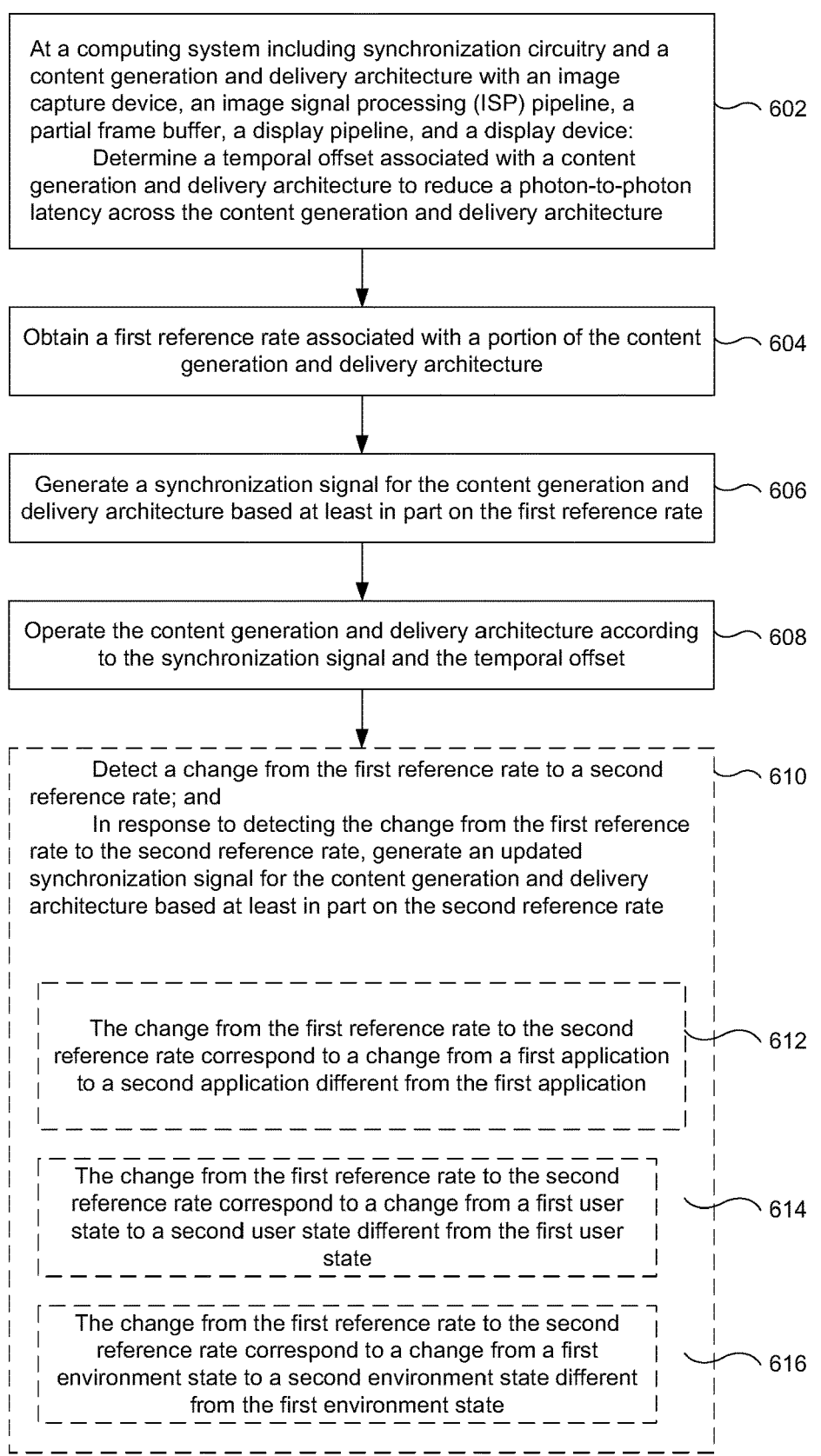

At a computing system including synchronization circuitry and a content generation and delivery architecture with an image capture device, an image signal processing (ISP) pipeline, a partial frame buffer, a display pipeline, and a display device:
        Determine a temporal offset associated with a content generation and delivery architecture to reduce a photon-to-photon latency across the content generation and delivery architecture ⟿ 602

Obtain a first reference rate associated with a portion of the content generation and delivery architecture ⟿ 604

Generate a synchronization signal for the content generation and delivery architecture based at least in part on the first reference rate ⟿ 606

Operate the content generation and delivery architecture according to the synchronization signal and the temporal offset ⟿ 608

Detect a change from the first reference rate to a second reference rate; and
        In response to detecting the change from the first reference rate to the second reference rate, generate an updated synchronization signal for the content generation and delivery architecture based at least in part on the second reference rate ⟿ 610

The change from the first reference rate to the second reference rate correspond to a change from a first application to a second application different from the first application ⟿ 612

The change from the first reference rate to the second reference rate correspond to a change from a first user state to a second user state different from the first user state ⟿ 614

The change from the first reference rate to the second reference rate correspond to a change from a first environment state to a second environment state different from the first environment state ⟿ 616

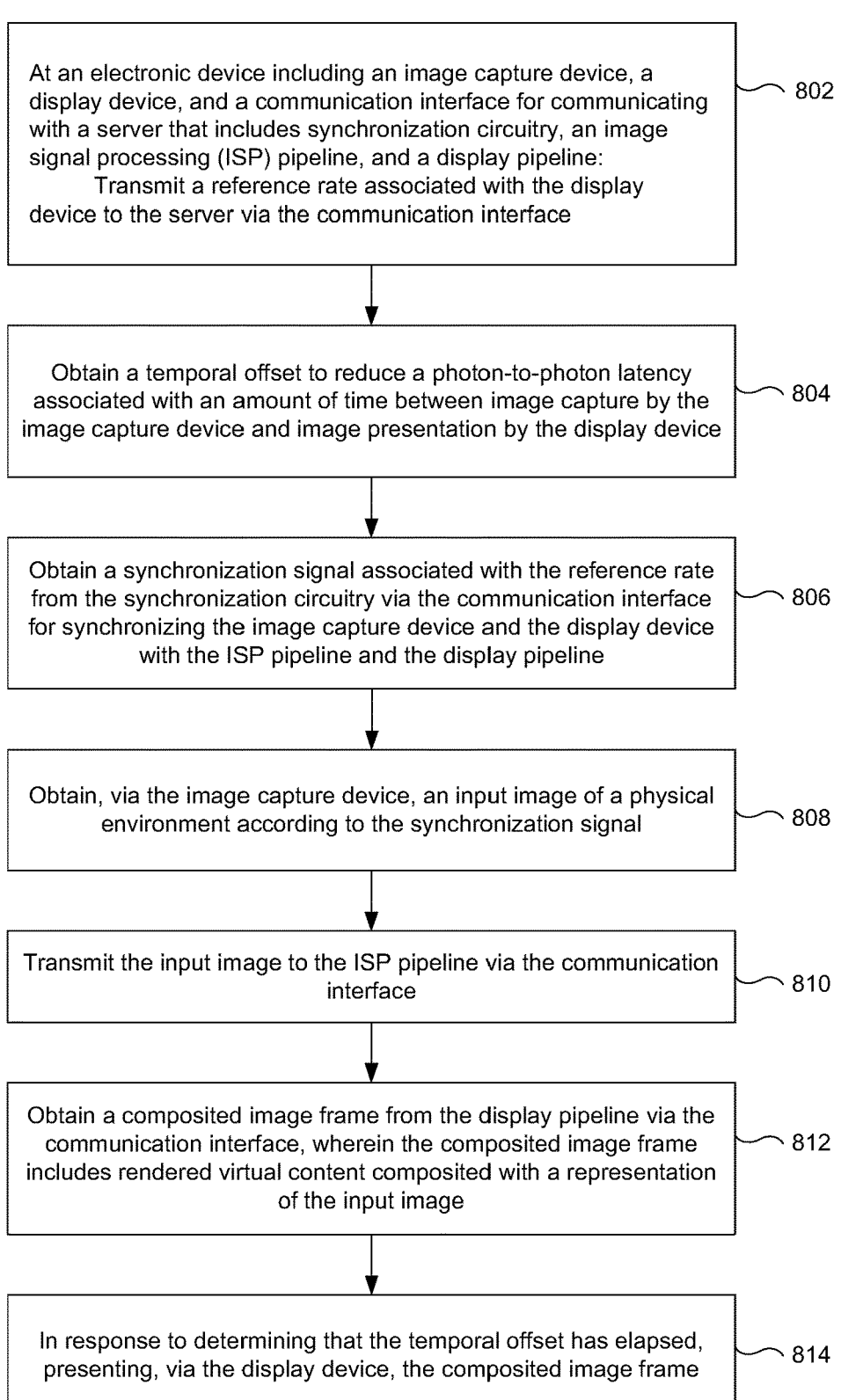

At an electronic device including an image capture device, a display device, and a communication interface for communicating with a server that includes synchronization circuitry, an image signal processing (ISP) pipeline, and a display pipeline:
    Transmit a reference rate associated with the display device to the server via the communication interface          802

Obtain a temporal offset to reduce a photon-to-photon latency associated with an amount of time between image capture by the image capture device and image presentation by the display device          804

Obtain a synchronization signal associated with the reference rate from the synchronization circuitry via the communication interface for synchronizing the image capture device and the display device with the ISP pipeline and the display pipeline          806

Obtain, via the image capture device, an input image of a physical environment according to the synchronization signal          808

Transmit the input image to the ISP pipeline via the communication interface          810

Obtain a composited image frame from the display pipeline via the communication interface, wherein the composited image frame includes rendered virtual content composited with a representation of the input image          812

In response to determining that the temporal offset has elapsed, presenting, via the display device, the composited image frame          814

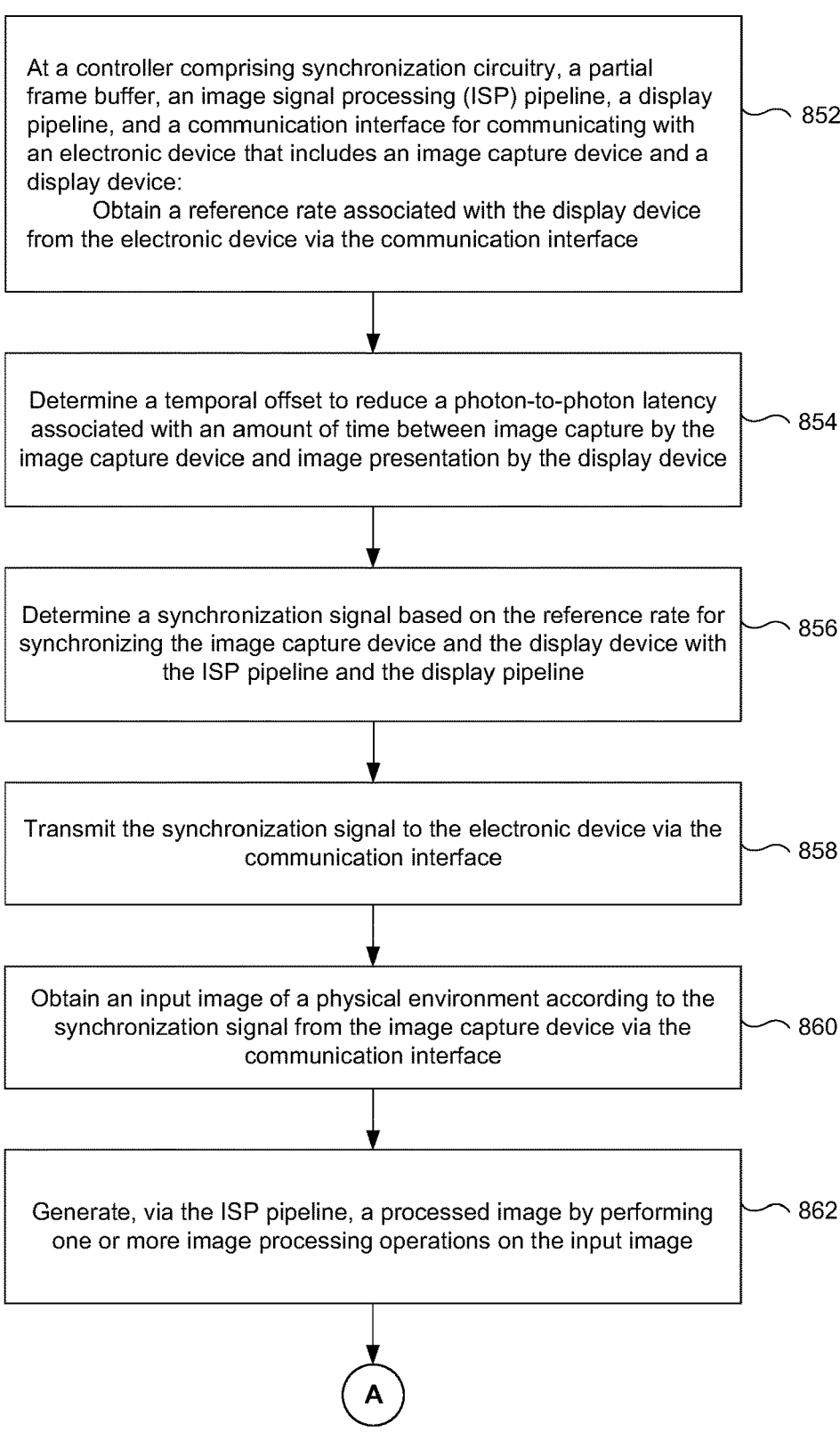

At a controller comprising synchronization circuitry, a partial frame buffer, an image signal processing (ISP) pipeline, a display pipeline, and a communication interface for communicating with an electronic device that includes an image capture device and a display device:
      Obtain a reference rate associated with the display device from the electronic device via the communication interface — 852

Determine a temporal offset to reduce a photon-to-photon latency associated with an amount of time between image capture by the image capture device and image presentation by the display device — 854

Determine a synchronization signal based on the reference rate for synchronizing the image capture device and the display device with the ISP pipeline and the display pipeline — 856

Transmit the synchronization signal to the electronic device via the communication interface — 858

Obtain an input image of a physical environment according to the synchronization signal from the image capture device via the communication interface — 860

Generate, via the ISP pipeline, a processed image by performing one or more image processing operations on the input image — 862

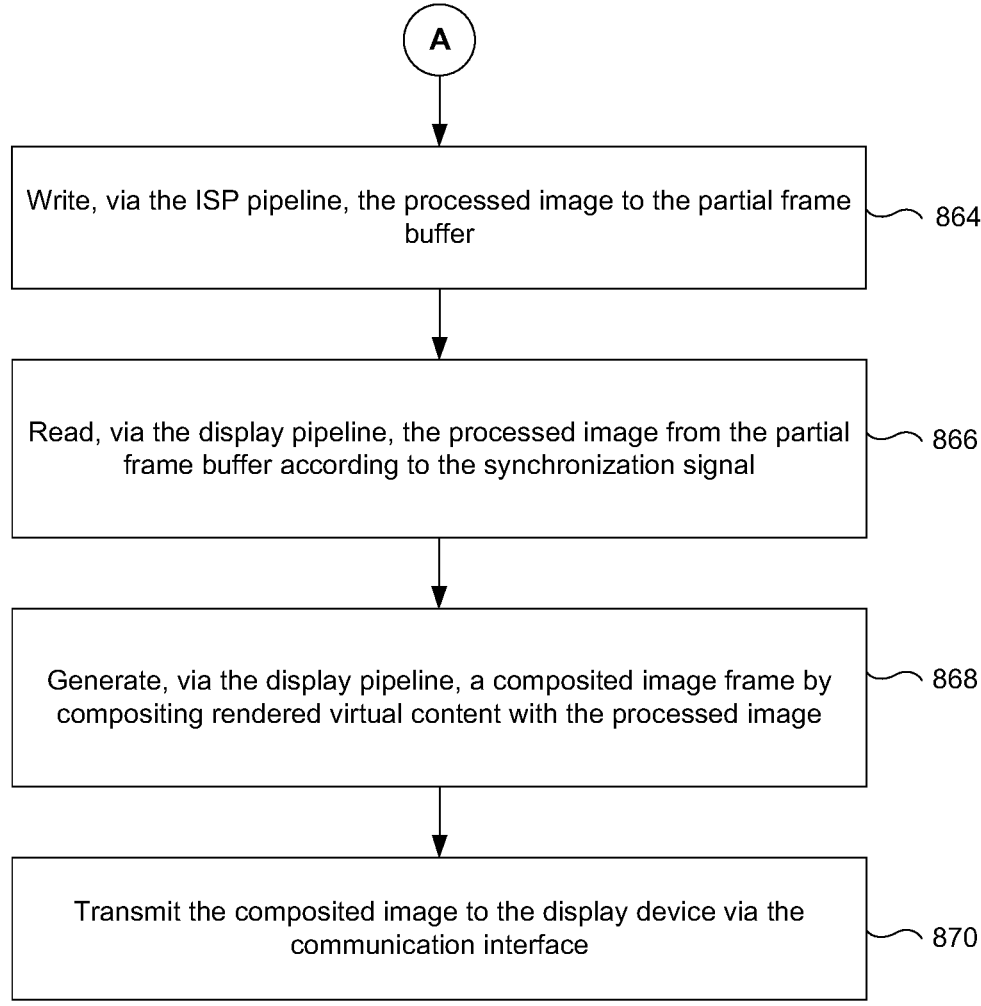

Write, via the ISP pipeline, the processed image to the partial frame buffer ⌐⁓ 864

Read, via the display pipeline, the processed image from the partial frame buffer according to the synchronization signal ⌐⁓ 866

Generate, via the display pipeline, a composited image frame by compositing rendered virtual content with the processed image ⌐⁓ 868

Transmit the composited image to the display device via the communication interface ⌐⁓ 870

Figure 8C

SYNCHRONIZATION CIRCUITRY FOR REDUCING LATENCY ASSOCIATED WITH IMAGE PASSTHROUGH

CROSS-REFERENCE TO RELATED APPLICATIONS

This application is claims priority to U.S. Provisional Patent App. No. 63/409,357, filed on Sep. 23, 2022, which is hereby incorporated by reference in its entirety.

TECHNICAL FIELD

The present disclosure generally relates to image processing, and in particular, to systems, methods, and devices for reducing latency associated with image passthrough.

BACKGROUND

Typically, a content generation and delivery architecture for image passthrough includes multiple portions such as an image capture device, an image signal processing (ISP) pipeline, multiple frame buffers, a display pipeline, and a display device. However, the content generation and delivery architecture may be associated with significant latency.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of a method of synchronizing a content generation and delivery architecture to reduce the latency associated with image passthrough in accordance with some implementations.

FIG. 8A is a flowchart representation of a method of synchronizing a content generation and delivery architecture to reduce the latency associated with image passthrough in accordance with some implementations.

FIGS. 8B and 8C illustrate a flowchart representation of a method of synchronizing a content generation and delivery architecture to reduce the latency associated with image passthrough in accordance with some implementations.

Figure 1A:
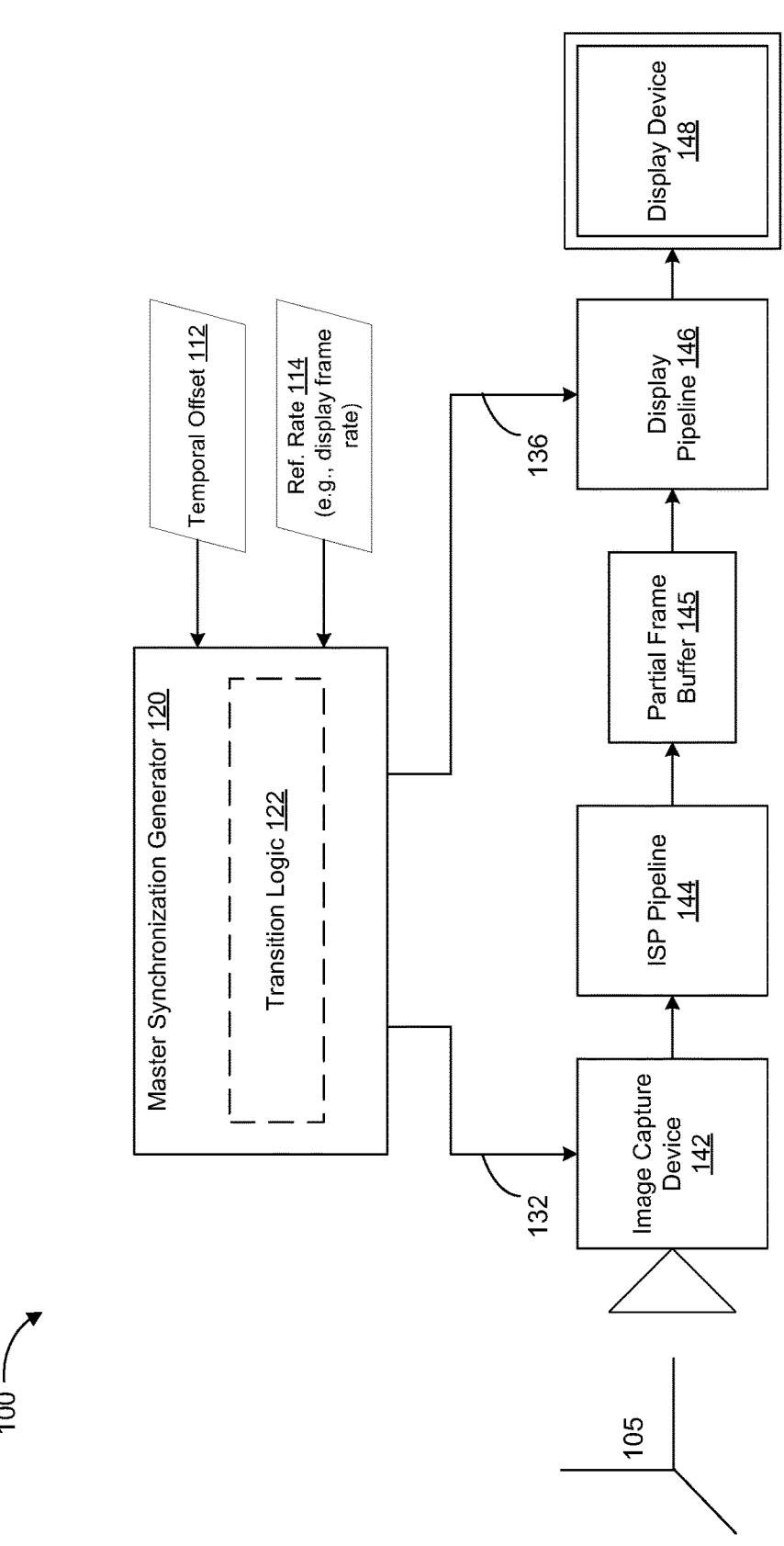
FIG. 1A is a block diagram of an example content generation and delivery architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synchronizing a content generation and delivery architecture to reduce the latency associated with image passthrough. According to some implementations, the method is performed at a computing system including non-transitory memory and one or more processors, synchronization circuitry, and a content generation and delivery architecture including an image capture device, an image signal processing (ISP) pipeline, a partial frame buffer, a display pipeline, and a display device. The method includes: determining a temporal offset associated with the content generation and delivery architecture to reduce a photon-to-photon latency across the content generation and delivery architecture; obtaining a first reference rate associated with a portion of the content generation and delivery architecture; generating, via the synchronization circuitry, a synchronization signal for the content generation and delivery architecture based at least in part on the first reference rate; and operating the content generation and delivery architecture according to the synchronization signal and the temporal offset.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, a content generation and delivery architecture for image passthrough includes multiple portions such as an image capture device, an image signal processing (ISP) pipeline, multiple frame buffers, a display pipeline, and a display device. As one example, the XR environment noted above includes image or video passthrough, whereby XR content is composited with or overlaid on images or video of the physical environment. However, the content generation and delivery architecture may be associated with significant latency. To achieve lower latency for image passthrough, the signal path from the image capture device to the display device may be simplified by synchronizing the clocks among the multiple portions of the content generation and delivery architecture and removing the multiple frame buffers entirely or replacing the multiple frame buffers with a partial frame buffer.

To this end, a master synchronization generator (MSG) generates a synchronization signal based on a reference rate (e.g., the refresh or display rate of the display device) and a temporal offset associated with reduction of photon-to-photon latency (e.g., duration between image capture by the image capture device and image presentation by the display device) to synchronize the clocks across the content generation and delivery architecture. In some implementations, the partial frame buffer is dynamically allocated based at least in part on the reference rate. According to some implementations, the partial frame buffer may be removed. In some implementations, the content generation and delivery architecture determines/selects the temporal offset in order to reduce the photon-to-photon latency and also to reduce the size of the partial frame buffer while not exhausting the partial frame buffer as discussed below with reference to FIGS. 5A-5C.

FIG. 1A is a block diagram of an example content generation and delivery architecture 100 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the content generation and delivery architecture 100 includes a master synchronization generator (MSG) 120, an image capture device 142, an image signal processing (ISP) pipeline 144, a partial frame buffer 145, a display pipeline 146, and a display device 148. In various implementations, the computing system 700 in FIG. 7 includes the content generation and delivery architecture 100 or provides the functionality thereof. According to some implementations, the electronic device 900 in FIG. 9, the controller 950 in FIG. 9, or a suitable combination thereof includes the content generation and delivery architecture 100 or provides the functionality thereof.

As shown in FIG. 1A, the image capture device 142 captures an input image of a physical environment 105. The ISP pipeline 144 generates a processed image by performing one or more image processing operations on the input image and writes the processed image to the partial frame buffer 145. The image capture device 142 and the ISP pipeline 144 are described in more detail below with reference to FIG. 1B. The partial frame buffer is described in more detail below with reference to FIG. 2B. According to some implementations, the ISP pipeline 144 may be directly coupled to the display pipeline 146 without the intervening partial frame buffer 145.

As shown in FIG. 1A, the display pipeline 146 reads the processed image from the partial frame buffer 145 and generates a composited image by compositing the processed image frame with rendered virtual content. Subsequently, the display device 148 presents the composited image or other content. The display pipeline 146 and the display device 148 are described in more detail below with reference to FIG. 1C.

As shown in FIG. 1A, the MSG 120 obtains (e.g., receives, retrieves, determines, selects, etc.) the temporal offset 112 in order to reduce the photon-to-photon latency 210 described below with reference to FIG. 2A and also to reduce the memory footprint of the partial frame buffer 145. The temporal offset 112 is described in more detail below with reference to FIG. 2A. In FIG. 1A, the MSG 120 also obtains (e.g., receives, retrieves, generates, etc.) a reference rate 114 such as a refresh rate or frame rate for the display device 148.

In FIG. 1A, the MSG 120 generates a synchronization signal 132 based on the temporal offset 112 and the reference rate 114. The MSG 120 provides the synchronization signal 132 to the image capture device 142 to synchronize its clock with the display pipeline 146 based on the reference rate 114. For example, the synchronization signal 132 includes one or more values for adjustable timing-related parameters associated with the image capture device 142 such as shutter speed, exposure length, and/or the like.

In FIG. 1A, the MSG 120 generates a synchronization signal 136 based on the temporal offset 112 and the reference rate 114. The MSG 120 provides the synchronization signal 136 to the display pipeline 146 to synchronize its clock with the image capture device 142 based on the reference rate 114. For example, the synchronization signal 136 includes one or more values for adjustable timing-related parameters associated with the display pipeline 146 such as the one or more rendering operations performed by the display pipeline 146, a read operation of the processed image from the partial frame buffer 145 performed by the display pipeline 146, and/or the like.

In some implementations, the synchronization signals 132 and 136 correspond to the same signal that includes the temporal offset 112 and the reference rate 114. In some implementations, the synchronization signals 132 and 136 also include values for one or more adjustable timing-related parameters for the image capture device 142 and the display pipeline 146, respectively.

In some implementations, the MSG 120 or a component thereof (e.g., the transition logic 122) detects a change (or a variation) in the reference rate 114 from a first reference rate to a second reference rate. As one example, the reference rate 114 increases from 90 Hz to 100 Hz. As another example, the reference rate 114 decreases from 100 Hz to 90 Hz. One of ordinary skill in the art that the aforementioned references rates are arbitrary, non-limiting frequency values that may be replaced with myriad other frequency values in various other implementations.

For example, the reference rate 114 may change when an application changes, for example, from a productivity application to a content consumption application, or the like. In this example, the application may change due to a selection or input from a user. For example, the reference rate 114 may change when a state of the user changes, for example, from sitting to standing, or the like. As another example, the reference rate 114 may change when a state of the environment changes, for example, from a bright environment to a dim environment, from a low frequency environment to a high frequency environment, or the like. As yet another example, the reference rate 114 may change when the content being presented changes from first content associated with a first region (e.g., 24 Hz or 60 Hz playback rate for US content) to playback of second content associated with a second region (e.g., 25 Hz or 50 Hz playback rate for EU content). One of ordinary skill in the art will appreciate that the reference rate 114 may change or vary for myriad reasons in other implementations.

In response to detecting the change to the reference rate 114 from the first reference rate to the second reference rate, the MSG 120 generates updated synchronization signals 132 and 136 based on the second reference rate and provides the updated synchronization signals 132 and 136 to the image capture device 142 and the display pipeline 146, respectively, to synchronize their clocks based on the second reference rate.

Figure 1B:
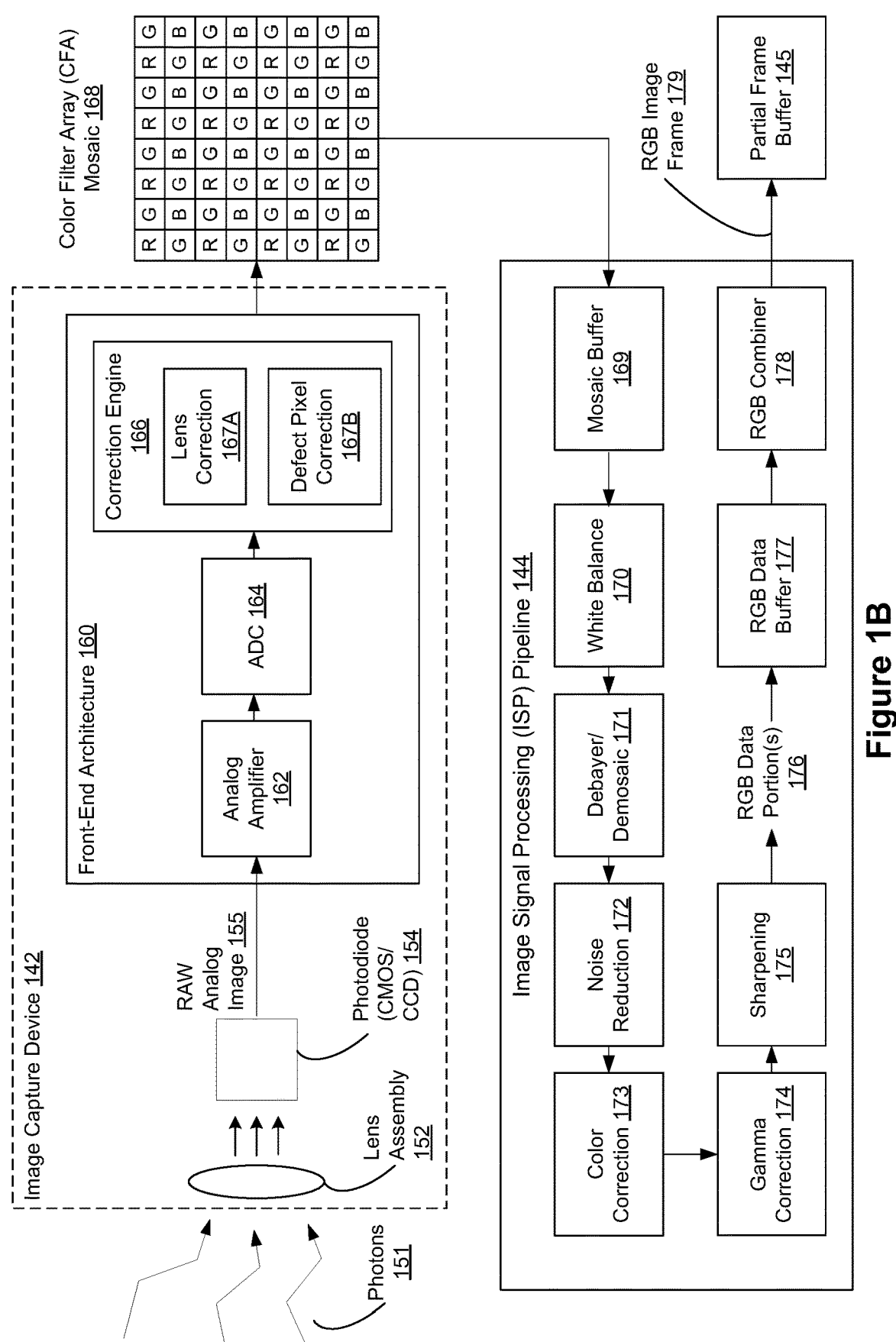
FIG. 1B is a block diagram of a first portion of the content generation and delivery architecture in FIG. 1A in accordance with some implementations.

FIG. 1B is a block diagram of a first portion of the content generation and delivery architecture 100 in FIG. 1A including the image capture device 142 and the ISP pipeline 144 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, FIG. 1B illustrates the first portion of the content generation and delivery architecture 100 in FIG. 1A including the image capture device 142 and the ISP pipeline 144.

As shown in FIG. 1B, the image capture device 142 includes a lens assembly 152 that focuses photons 151 onto a photodiode 154 (e.g., a complimentary metal-oxide-semiconductor (CMOS) image sensor or a charge-coupled device (CCD) image sensor). The photodiode 154 generates a RAW analog image 155 that is fed to a front-end architecture 160, which includes an analog amplifier 162 and an analog-to-digital converter (ADC) 164. A correction engine 166 performs one or more operations and/or algorithms on the output of the ADC 164 such as lens correction 167A, defect pixel correction 167B, and/or the like. As such, as shown in FIG. 1B, the output of the image capture device 142 is a color filter array (CFA) mosaic 168, which may also be referred to in the art as a "RAW Bayer input" or "RAW image data."

As shown in FIG. 1B, the ISP pipeline 144 reads the CFA mosaic 168 from the image capture device 142 into a mosaic buffer 169. As one example, the mosaic buffer 169 corresponds to a first-in-first out (FIFO) buffer or the like. In some implementations, the mosaic buffer 169 corresponds to a single buffer or a plurality of buffers.

Thereafter, the ISP pipeline 144 performs one or more image processing operations and/or algorithms on the CFA mosaic 168, such as white balance 170, debayering/demosaicking 171, noise reduction 172, color correction 173, gamma correction 174, and sharpening 175, in order to produce RGB data portions 176. In some implementations, the RGB data portions 176 are accumulated in an RGB data buffer 177 until the RGB combiner 178 combines RGB data portions 176 from the RGB data buffer 177 into an RGB image frame 179 and writes the RGB image frame 179 to the partial frame buffer 145. In some implementations, the RGB data portions 176 bypass the RGB data buffer 177, and the RGB data portions 176 are written to the partial frame buffer 145. The partial frame buffer is described in more detail below with reference to FIG. 2B.

In some implementations, the RGB data buffer 177 corresponds to a single buffer or a plurality of buffers. As noted above, one of ordinary skill in the art will appreciate that in various implementations the RGB data portions 176 and the RGB image frame 179 may be replaced with data portions and image frames that are associated with various other color spaces different from RGB such as YCbCr, CMYK, or the like.

One of ordinary skill in the art will appreciate that the operations and/or algorithms described herein with reference to FIG. 1B are merely exemplary and that other operations and/or algorithms may be performed in various other implementations. Furthermore, one of ordinary skill in the art will appreciate that the order of the operations and/or algorithms described herein with reference to FIG. 1B is merely exemplary and that the operations and/or algorithms may be performed in other orders, sequences, and/or in parallel in various other implementations.

Figure 1C:
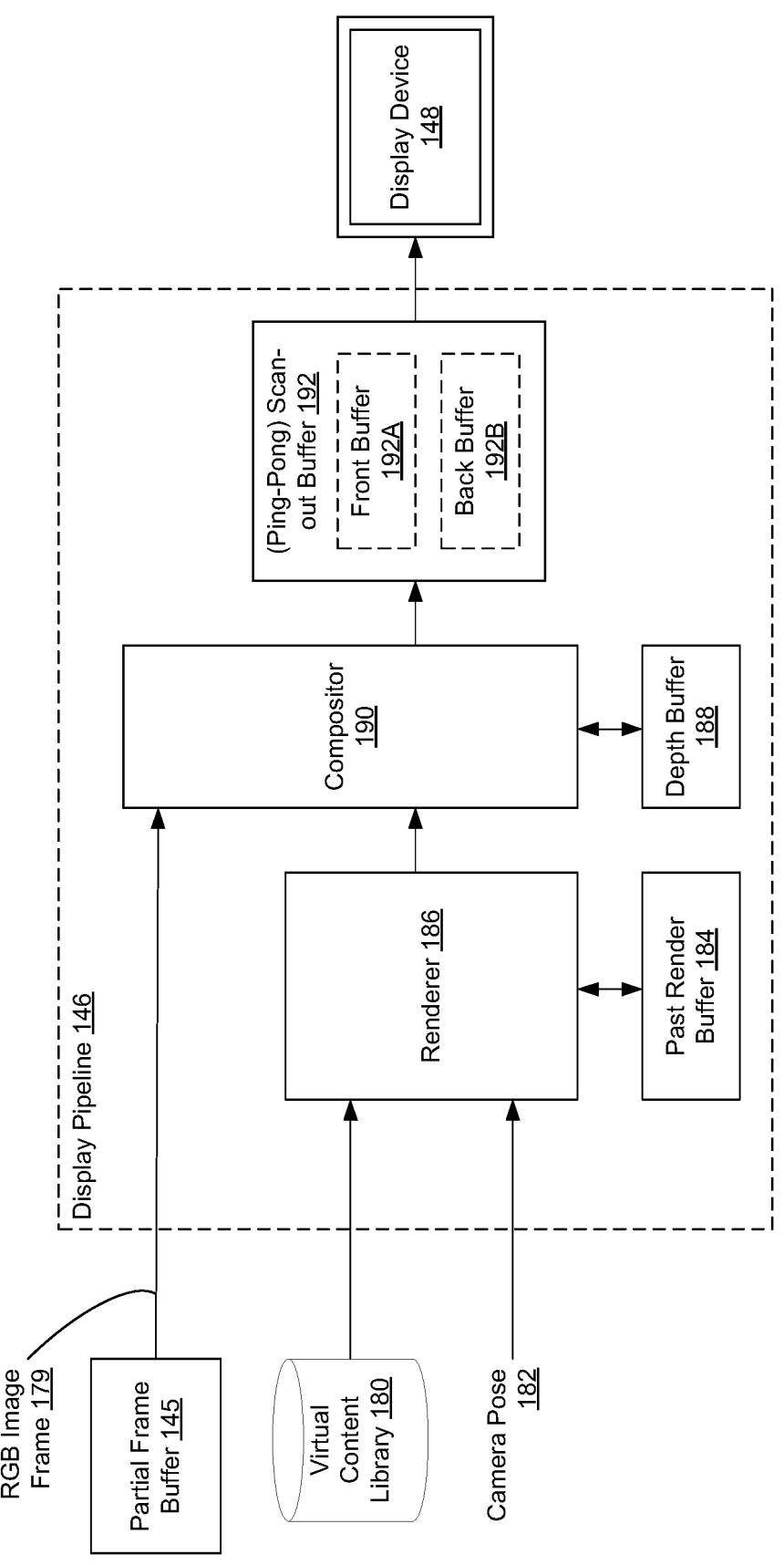
FIG. 1C is a block diagram of a second portion of the content generation and delivery architecture in FIG. 1A in accordance with some implementations.

FIG. 1C is a block diagram of a second portion of the content generation and delivery architecture 100 in FIG. 1A including the display pipeline 146 and the display device 148 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, FIG. 1C illustrates the second portion of the content generation and delivery architecture 100 in FIG. 1A including the display pipeline 146 and the display device 148.

As shown in FIG. 1C, the display pipeline 146 includes a renderer 186 that renders virtual content from a virtual content library 180 according to a perspective that corresponds to a camera pose 182 of the image capture device 142 relative to the physical environment 105 for a current time period and optionally a past rendering iteration of the virtual content from the past render buffer 184. The display pipeline 146 also includes a compositor 190 that composites the rendered virtual content with the RGB image frame 179 based on depth information associated with the physical environment 105 from the depth buffer 188 to generate a composited image for a graphical environment (sometimes also referred to herein as the "extended reality (XR) environment") that is stored in the scan-out buffer 192.

In some implementations, the scan-out buffer 192 stores the one or more composited images for the graphical environment (sometimes also referred to herein as the "XR environment") or other content. In one example, the scan-out buffer 192 corresponds to a ping-pong buffer including a front buffer 192A and a back buffer 192B. One of ordinary skill in the art will appreciate that the scan-out buffer 192 may be structured differently in various other implementations. Thereafter, the display device 148 displays the composited image associated with the state of the graphical environment for the current time period. In some implementations, the display device 148 corresponds to an integrated display. In some implementations, the display device 148 corresponds to an external display. In some implementations, the display device 148 corresponds to a cloud-based recorder, a re-encoder, or the like that is accessible to an end-user device.

Figure 2A:
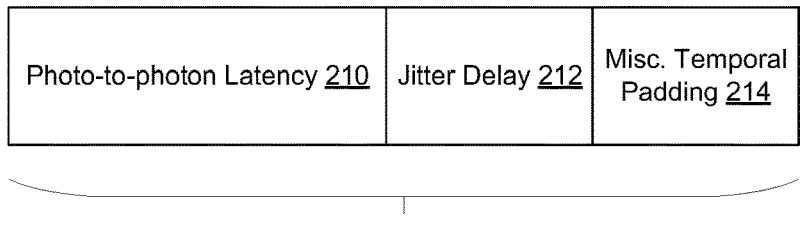
FIG. 2A illustrates an example latency diagram associated with the content generation and delivery architecture in FIG. 1A in accordance with some implementations.

FIG. 2A illustrates an example latency diagram 200 associated with the content generation and delivery architecture 100 in FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 2A illustrates a latency diagram 200 associated with the content generation and delivery architecture 100 in FIG. 1A.

A shown in FIG. 2A, the latency diagram 200 includes an image capture device latency 202 associated with a first amount of time for capturing an input image (e.g., the CFA mosaic 168 in FIG. 1B) and an image capture device readout latency 204 associated with a second amount of time for reading the input image (e.g., the CFA mosaic 168 in FIG. 1B) out of the image capture device 142 and into the ISP pipeline 144.

In FIG. 2A, the latency diagram 200 also includes an ISP pipeline latency 205 associated with a third amount of time for generating a processed image by performing one or more image processing operations (e.g., the operations 174 to 184 in FIG. 1B) on the input image and writing the processed image to the partial frame buffer 145. The latency diagram further includes a display pipeline latency 206 associated with a fourth amount of time for reading the processed image out of the partial frame buffer 145 and generating a composited image based at least in part on the processed image. The latency diagram further includes a display device latency 208 associated with a fifth amount of time for presenting the composited image via the display device 148.

As shown in FIG. 2A, a photon-to-photon latency 210 is associated with an amount of time from photon collection (e.g., capture of the input image by the image capture device 142) to photon presentation (e.g., presentation of the composited image by the display device 148). According to some implementations, the photon-to-photon latency 210 factors in the content production rate (e.g., the image capture rate of the image capture device 142, and the image processing rate of the ISP pipeline 144) and the content consumption rate (e.g., the rendering and compositing rate of the display pipeline 146, and the refresh or frame rate of the display device 148).

According to some implementations, the content generation and delivery architecture 100 determines the temporal offset 112 in order to reduce the photon-to-photon latency 210 and also to account for a jitter delay 212 (e.g., buffer time to account for jitter, hysteresis, and/or the like) and miscellaneous temporal padding 214. For example, the temporal offset 112 corresponds to a summation of the photon-to-photon latency 210, the jitter delay 212, and the miscellaneous temporal padding 214.

Figure 2B:
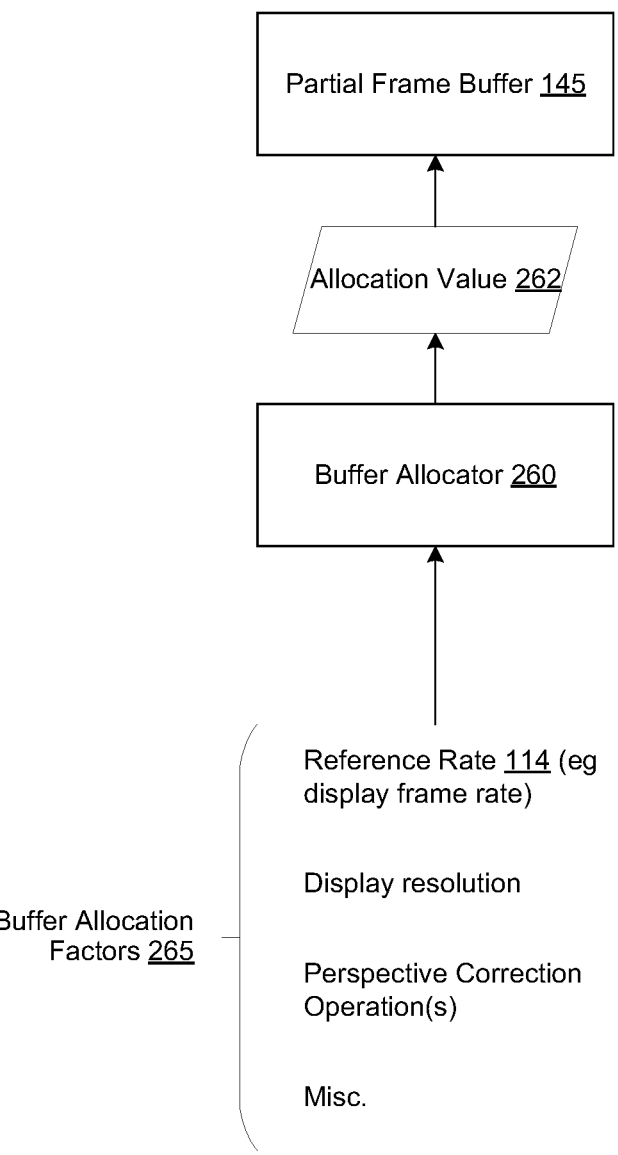
FIG. 2B is a block diagram of an example partial frame buffer associated with the content generation and delivery architecture in FIG. 1A in accordance with some implementations.

FIG. 2B is a block diagram of an example partial frame buffer 145 associated with the content generation and delivery architecture 100 in FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the content generation and delivery architecture 100 in FIG. 1A includes a buffer allocator 260 configured to dynamically allocate memory for the partial frame buffer 145.

As shown in FIG. 2B, the buffer allocator 260 determines an allocation value 262 (e.g., a size value for the memory footprint of the partial frame buffer 145) based on the one or more buffer allocation factors 265 such as the reference rate 114, the exposure length associated with the image capture device 142, the image capture device readout latency 204 as shown in FIG. 2A, the ISP pipeline latency 205 as shown in FIG. 2A, software jitter, a resolution value associated with the display device 148, one or more downstream perspective correction operations performed by the content generation and delivery architecture 100 in FIG. 1A, one or more image processing operations (e.g., warping operations to account for various factors such as chromatic aberration from a lens associated with the display device 148, calibration of the image capture device 142, gaze direction of a user, and/or the like) performed by the content generation and delivery architecture 100 in FIG. 1A, and/or the like. Furthermore, in some implementations, in response to detecting a change in the reference rate 114 from a first reference rate to a second reference rate, the buffer allocator 260 determines an updated allocation value 262 based at least in part on the second reference rate.

Figure 3A:
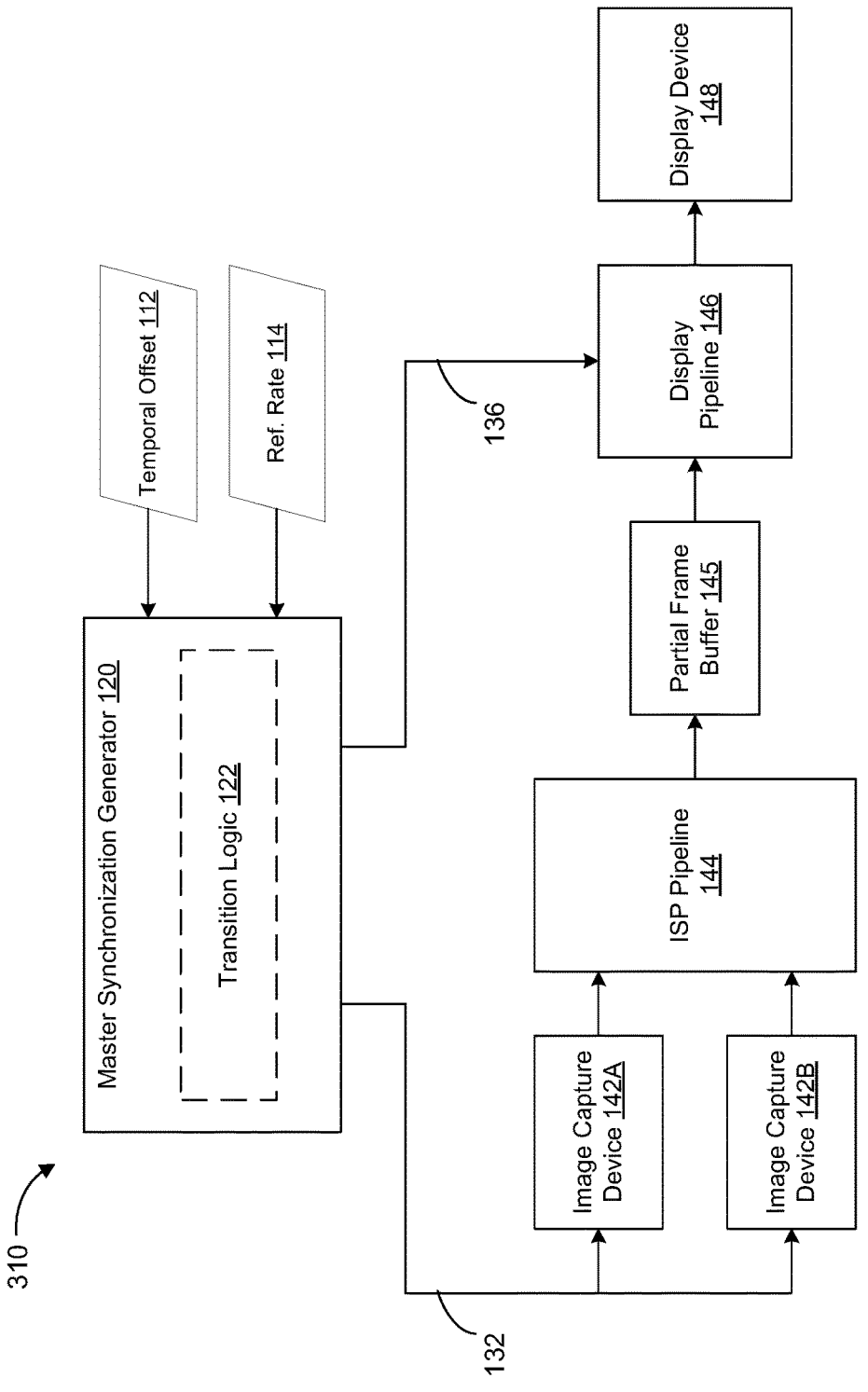
FIG. 3A is a block diagram of an example content generation and delivery architecture with multiple image capture devices in accordance with some implementations.

FIG. 3A is a block diagram of an example content generation and delivery architecture 310 with multiple image capture devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the content generation and delivery architecture 310 in FIG. 3A is similar to and adapted from the content generation and delivery architecture 100 in FIG. 1A. To that end, similar reference numbers are used in FIGS. 1A and 3A and only the differences therebetween will be discussed for the sake of brevity.

As shown in FIG. 3A, the content generation and delivery architecture 310 includes a first image capture device 142A and a second image capture device 142B. For example, the first image capture device 142A and the second image capture device 142B correspond to different perspectives of the physical environment 105. Furthermore, in FIG. 3A, the MSG 120 provides the synchronization signal 132 to the first image capture device 142A and the second image capture device 142B to synchronize their clocks with the display pipeline 146 based on the reference rate 114.

Figure 3B:
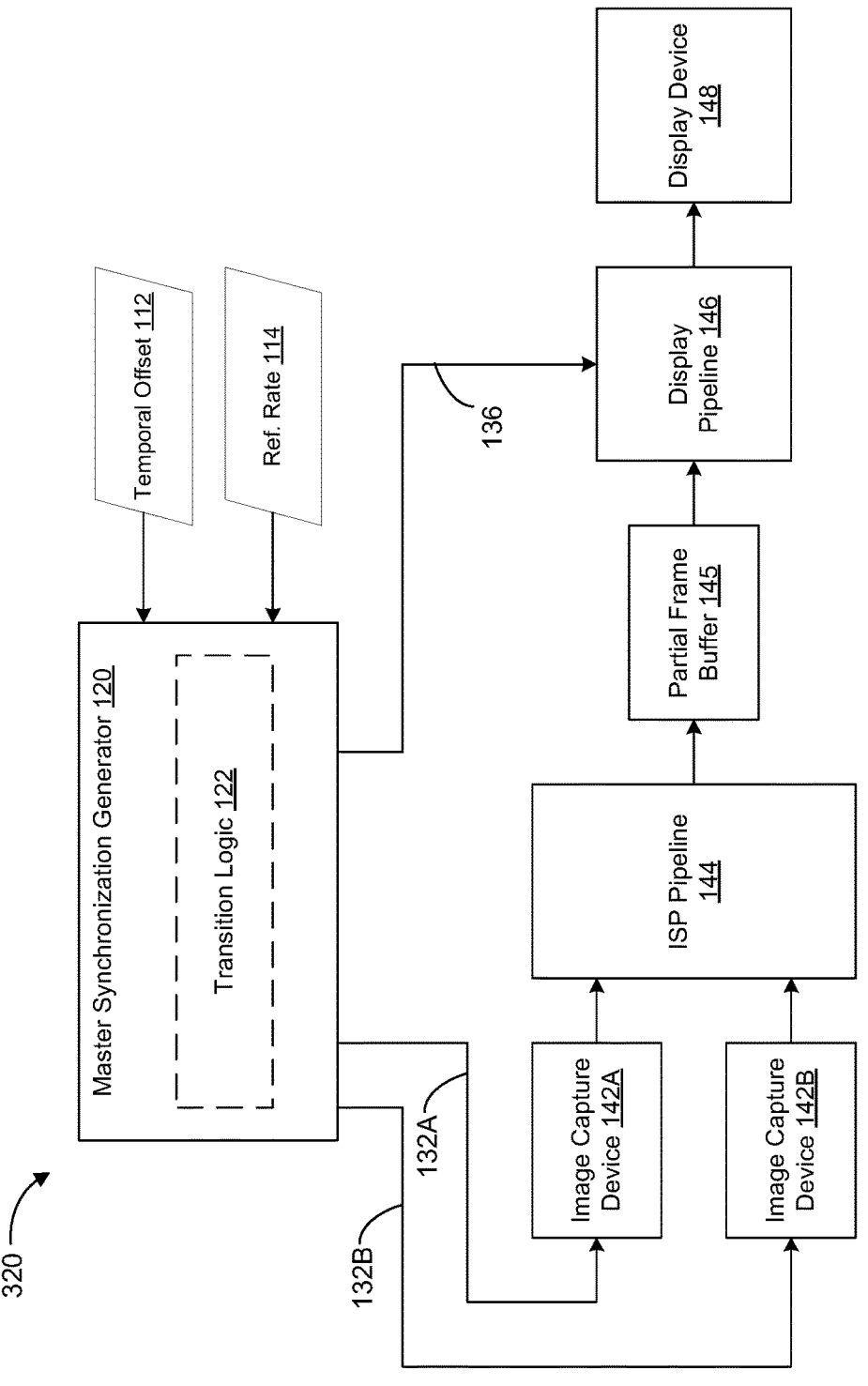
FIG. 3B is a block diagram of another example content generation and delivery architecture with multiple image capture devices in accordance with some implementations.

FIG. 3B is a block diagram of another example content generation and delivery architecture 320 with multiple image capture devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the content generation and delivery architecture 320 in FIG. 3B is similar to and adapted from the content generation and delivery architecture 100 in FIG. 1A. To that end, similar reference numbers are used in FIGS. 1A and 3B and only the differences therebetween will be discussed for the sake of brevity.

As shown in FIG. 3B, the content generation and delivery architecture 310 includes a first image capture device 142A and a second image capture device 142B. For example, the first image capture device 142A and the second image capture device 142B correspond to different perspectives of the physical environment 105.

In FIG. 3B, the MSG 120 generates a synchronization signal 132A based on the temporal offset 112 and the reference rate 114. The MSG 120 provides the synchronization signal 132A to the first image capture device 142A to synchronize its clock with the display pipeline 146 based on the reference rate 114.

In FIG. 3B, the MSG 120 also generates a synchronization signal 132B based on the temporal offset 112 and the reference rate 114. The MSG 120 provides the synchronization signal 132B to the second image capture device 142B to synchronize its clock with the display pipeline 146 based on the reference rate 114.

Figure 3C:
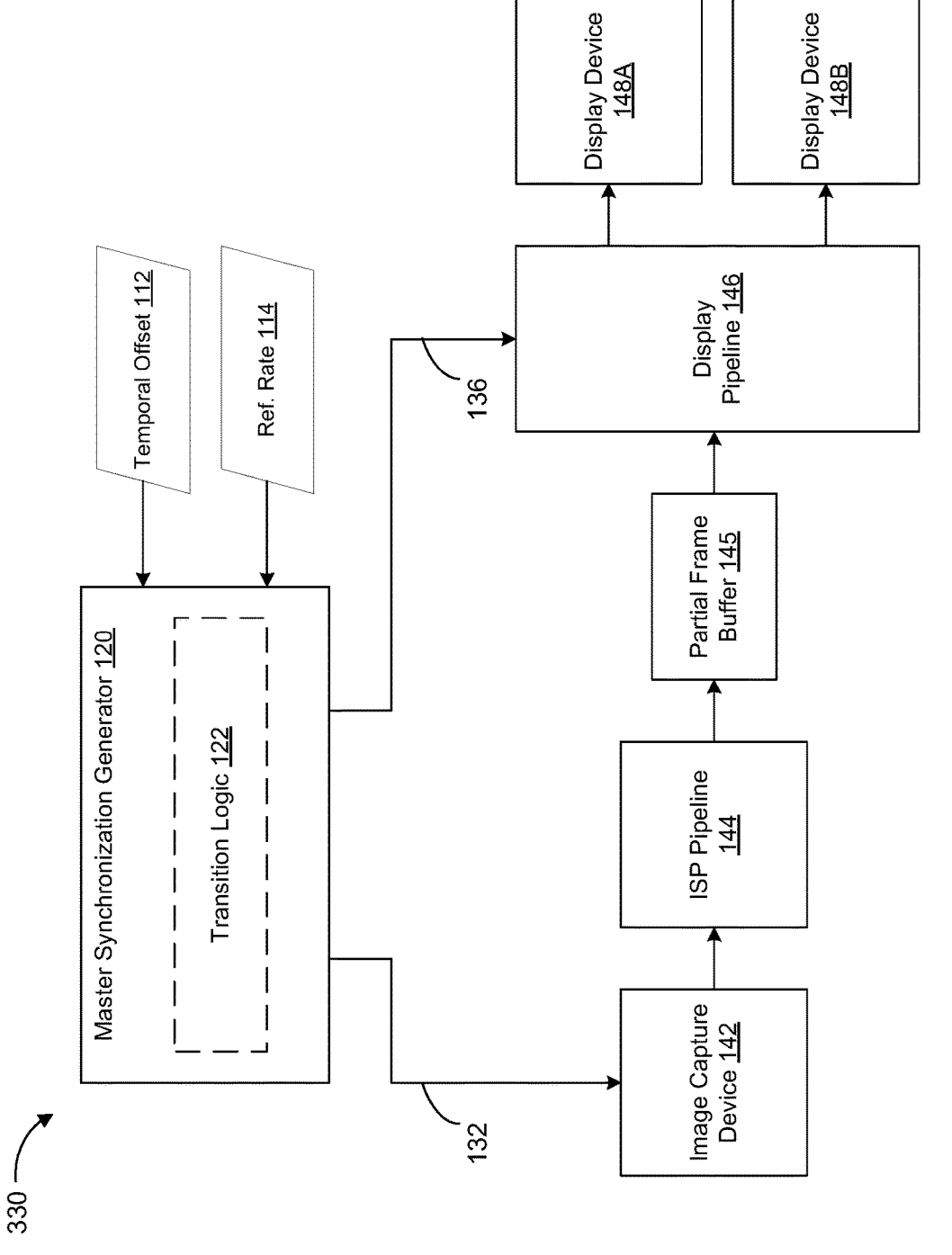
FIG. 3C is a block diagram of an example content generation and delivery architecture with multiple display devices in accordance with some implementations.

FIG. 3C is a block diagram of an example content generation and delivery architecture 330 with multiple display devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the content generation and delivery architecture 330 in FIG. 3C is similar to and adapted from the content generation and delivery architecture 100 in FIG. 1A. To that end, similar reference numbers are used in FIGS. 1A and 3C and only the differences therebetween will be discussed for the sake of brevity.

As shown in FIG. 3C, the content generation and delivery architecture 330 includes a first display device 148A and a second display device 148B. For example, the first display device 148A corresponds to a display for a first eye of a user, and the second display device 148B corresponds to a display for a second eye of the user. In some implementations, the display pipeline 146 may adapt the composited image for stereoscopic presentation via the first display device 148A and the second display device 148B. As such, with reference to FIG. 3C, the MSG 120 synchronizes the display of content across physical devices such as the first display device 148A and the second display device 148B.

Figure 3D:
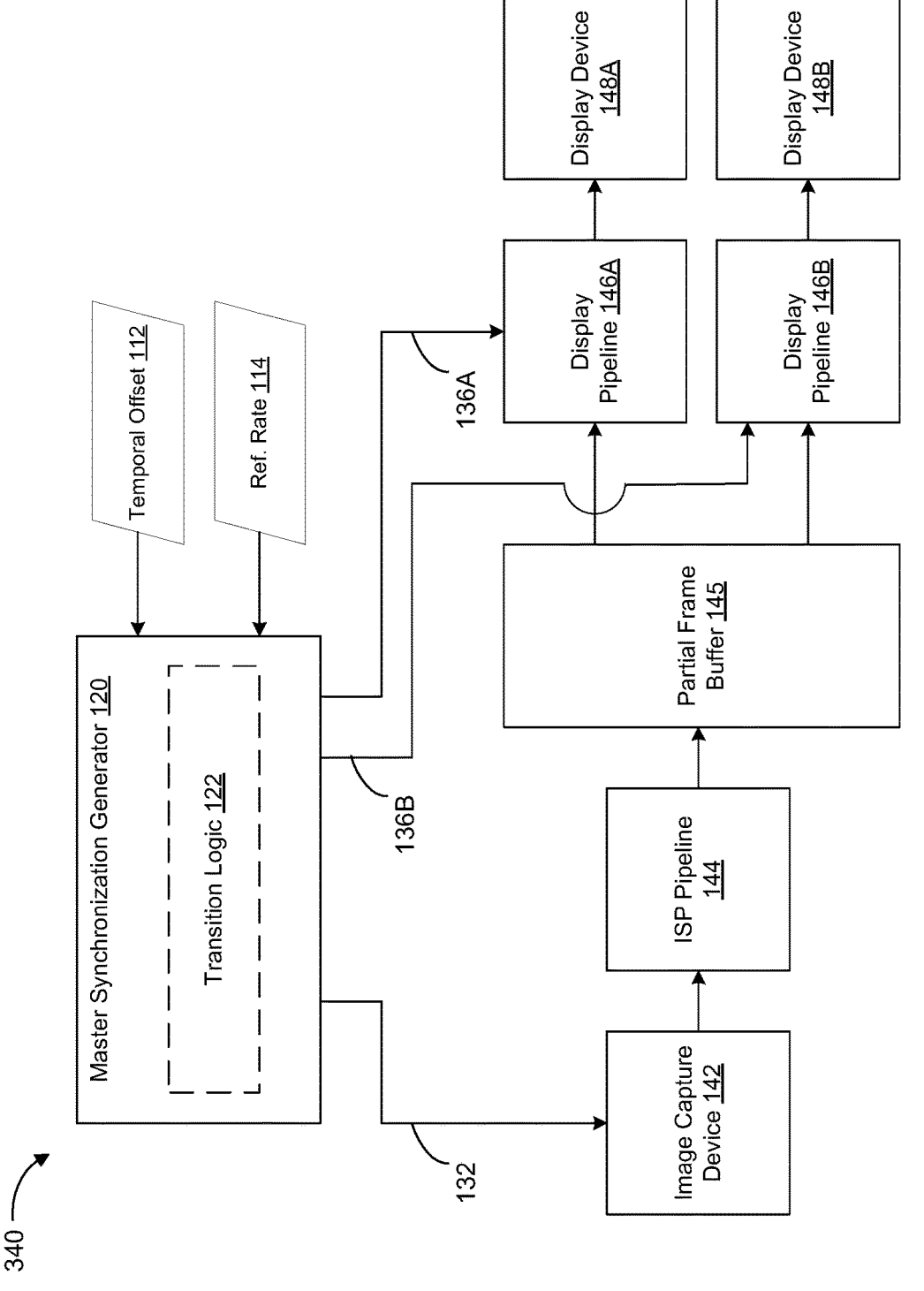
FIG. 3D is a block diagram of another example content generation and delivery architecture with multiple display devices in accordance with some implementations.

FIG. 3D is a block diagram of another example content generation and delivery architecture 340 with multiple display devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the content generation and delivery architecture 340 in FIG. 3D is similar to and adapted from the content generation and delivery architecture 100 in FIG. 1A. To that end, similar reference numbers are used in FIGS. 1A and 3D and only the differences therebetween will be discussed for the sake of brevity.

As shown in FIG. 3D, the content generation and delivery architecture 340 includes a first display device 148A and a second display device 148B. For example, the first display device 148A is associated with a first eye of a user, and the second display device 148B is associated with a second eye of the user. Furthermore, with reference to FIG. 3D, the content generation and delivery architecture 340 includes a first display pipeline 146A associated with the first display device 148A and a second display pipeline 146B associated with the second display device 148B.

In FIG. 3D, the MSG 120 generates a synchronization signal 136A based on the temporal offset 112 and the reference rate 114. The MSG 120 provides the synchronization signal 136A to the first display pipeline 146A to synchronize its clock with the image capture device 142 based on the reference rate 114. In FIG. 3D, the MSG 120 also generates a synchronization signal 136B based on the temporal offset 112 and the reference rate 114. The MSG 120 provides the synchronization signal 136B to the second display pipeline 146B to synchronize its clock with the image capture device 142 based on the reference rate 114. As such, with reference to FIG. 3D, the MSG 120 synchronizes the rendering of content across the first display pipeline 146A and the second display pipeline 146B and the display of content across the first display device 148A and the second display device 148B.

Figure 3E:
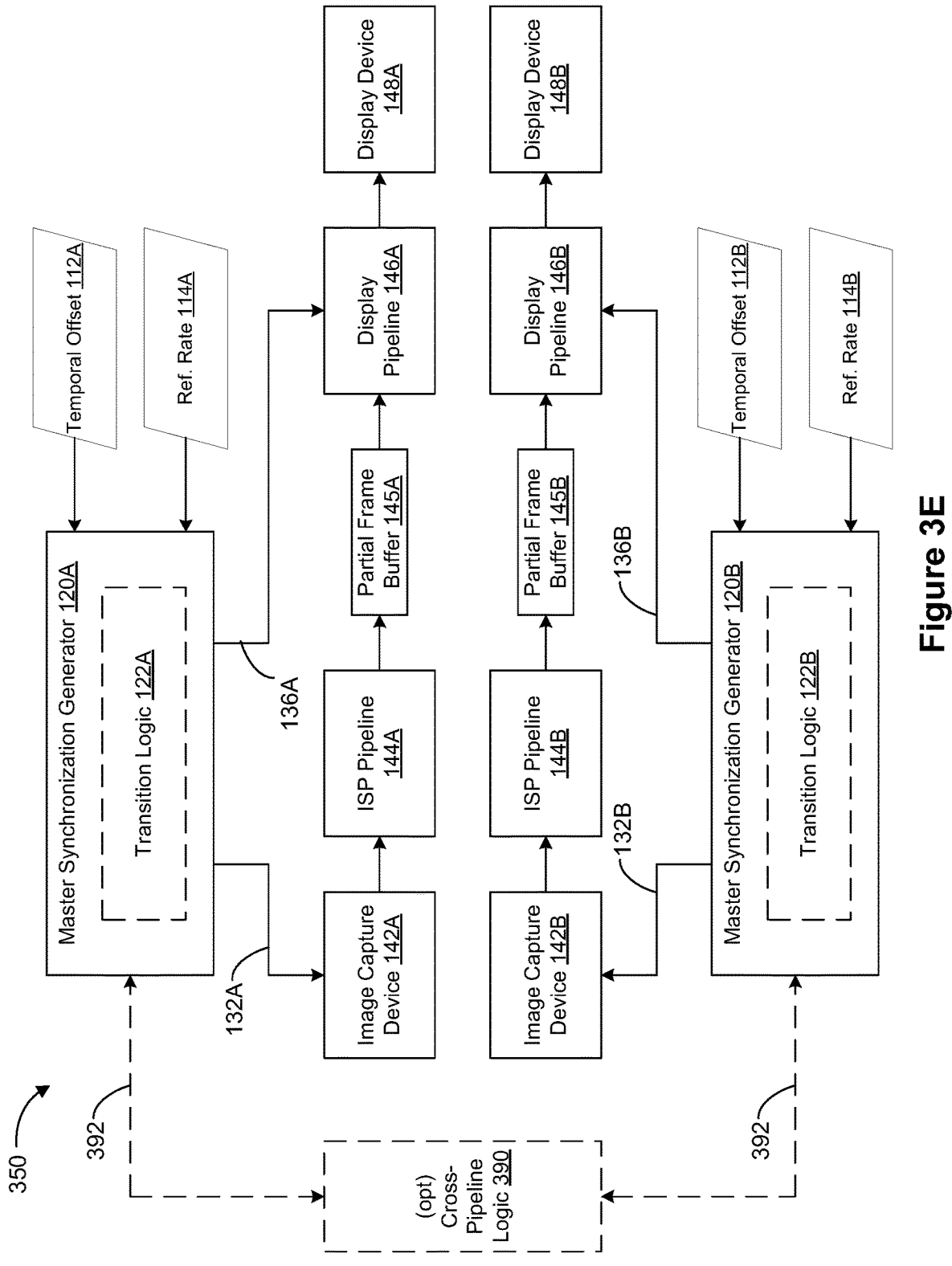
FIG. 3E is a block diagram of an example content generation and delivery architecture with multiple image capture devices and multiple display devices in accordance with some implementations.

FIG. 3E is a block diagram of an example content generation and delivery architecture 350 with multiple image capture devices and multiple display devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the content generation and delivery architecture 350 in FIG. 3E is similar to and adapted from the content generation and delivery architecture 100 in FIG. 1A. To that end, similar reference numbers are used in FIGS. 1A and 3E and only the differences therebetween will be discussed for the sake of brevity.

As shown in FIG. 3E, the content generation and delivery architecture 350 includes parallel pipelines. In FIG. 3E, a first pipeline of the content generation and delivery architecture 350 includes a first image capture device 142A, a first ISP pipeline 144A, a first partial frame buffer 145A, a first display pipeline 146A, and a first display device 148A.

In FIG. 3E, a second pipeline of the content generation and delivery architecture 350 includes a second image capture device 142B, a second ISP pipeline 144B, a second partial frame buffer 145B, a second display pipeline 146B, and a second display device 148B.

For example, the first image capture device 142A and the second image capture device 142B correspond to different perspectives of the physical environment 105. For example, the first display device 148A is associated with a first eye of a user, and the second display device 148B is associated with a second eye of the user.

As shown in FIG. 3E, the first MSG 120A obtains (e.g., receives, retrieves, generates, determines, etc.) a first temporal offset 112A associated with the first pipeline and a first reference rate 114A associated with the first pipeline such as a refresh rate or frame rate for the first display device 148A.

In FIG. 3E, the first MSG 120A generates a synchronization signal 132A based on the first temporal offset 112A and the first reference rate 114A. The first MSG 120A provides the synchronization signal 132A to the first image capture device 142A to synchronize its clock with the first display pipeline 146A based on the first reference rate 114A.

In FIG. 3E, the first MSG 120A generates a synchronization signal 136A based on the first temporal offset 112A and the first reference rate 114A. The first MSG 120A provides the synchronization signal 136A to the first display pipeline 146A to synchronize its clock with the first image capture device 142A based on the first reference rate 114A.

Similarly, as shown in FIG. 3E, the second MSG 120B obtains (e.g., receives, retrieves, generates, determines, etc.) a second temporal offset 112B associated with the second pipeline and a second reference rate 114B associated with the second pipeline such as a refresh rate or frame rate for the second display device 148B.

In FIG. 3E, the second MSG 120B generates a synchronization signal 132B based on the second temporal offset 112B and the second reference rate 114B. The second MSG 120B provides the synchronization signal 132B to the second image capture device 142B to synchronize its clock with the second display pipeline 146B based on the second reference rate 114B.

In FIG. 3E, the second MSG 120B generates a synchronization signal 136B based on the second temporal offset 112B and the second reference rate 114B. The second MSG 120B provides the synchronization signal 136B to the second display pipeline 146B to synchronize its clock with the second image capture device 142B based on the second reference rate 114B.

In various implementations, as shown in FIG. 3E, the content generation and delivery architecture 350 includes an optional cross-pipeline logic 390 for synchronizing the first and second pipelines. For example, the cross-pipeline logic 390 generates a cross-pipeline synchronization signal 392 and provides the cross-pipeline synchronization signal 392 to the first MSG 120A and the second MSG 120B. One of ordinary skill in the art will appreciate that the content generation and delivery architecture 350 may be modified in myriad ways in various other implementations. As such, with reference to FIG. 3E, the MSG 120 synchronizes the rendering and display of content across physical devices such as the first and second pipelines.

Figure 4A:
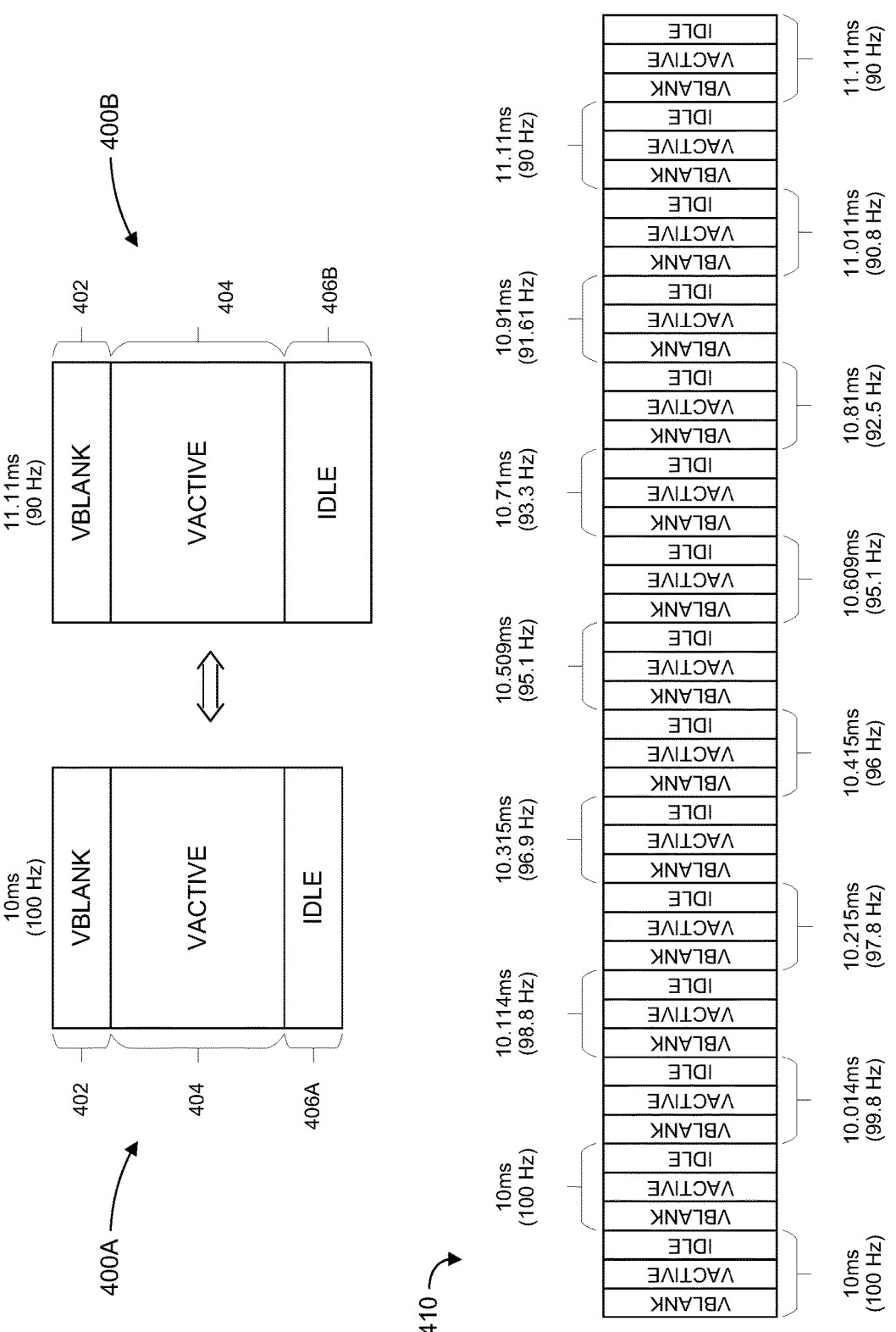
FIG. 4A illustrates an example sequence of display-related intervals associated with transitioning from a first frame rate to a second frame rate in accordance with some implementations.

FIG. 4A illustrates an example sequence of display-related intervals 410 associated with transitioning from a first frame rate to a second frame rate in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as one example, the content generation and delivery architecture 100 in FIG. 1A or a component thereof (e.g., the transition logic 122) detects a transition from a first reference rate (e.g., 100 Hz display refresh or frame rate) to a second reference rate (e.g., 90 Hz display refresh or frame rate). Continuing with this example, in response to detecting the transition in the reference rate, the content generation and delivery architecture 100 in FIG. 1A or a component thereof (e.g., the transition logic 122) causes the display pipeline 146 and/or the display device 148 to operate according to the sequence of display-related intervals 410.

In FIG. 4A, when the display refresh or frame rate correspond to 100 Hz, a display-related interval 400A includes a first amount of time 402 for a vertical blank display operation (VBLANK), a second amount of time 404 for a vertical active display operation (VACTIVE), and a third amount of time 406A for an idle display operation (IDLE).

In FIG. 4A, when the display refresh or frame rate correspond to 90 Hz, a display-related interval 400B includes the first amount of time 402 for the vertical blank period (VBLANK) of a scan-out operation, the second amount of time 404 for the vertical active period (VACTIVE) of the scan-out operation, and a third amount of time 406B for an idle period (IDLE) of the scan-out operation.

As shown in FIG. 4A, the display-related intervals 400A and 400B include the same amount of time 402 for VBLANK and the same amount of time 404 for VACTIVE. However, the display-related intervals 400A and 400B include different amounts of time 406A and 406B, respectively, for IDLE. In FIG. 4A, the amount of time 406B is greater than the amount of time 406A. In other words, VBLANK and VACTIVE are associated with static values whereas IDLE is associated with a dynamic value that is adjusted based on the reference rate (e.g., the display refresh or frame rate).

For example, in response to detecting a transition from a first reference rate (e.g., 100 Hz display refresh or frame rate) to a second reference rate (e.g., 90 Hz display refresh or frame rate), the content generation and delivery architecture 100 in FIG. 1A updates the synchronization signal 136 provided to the display pipeline 146 and/or the display device 148. In response to obtaining the updated synchronization signal 136, the display pipeline 146 and/or the display device 148 decreases its clock frequency from 100 Hz to 90 Hz across the sequence of display-related intervals 410 by slowly increasing the amount of time associated with IDLE. For example, with reference to FIG. 4A, the content generation and delivery architecture 100 in FIG. 1A decreases the clock frequency of the display pipeline 146 and/or the display device 148 by approximately 0.9 to 1.0 Hz per interval over the sequence of display-related intervals 410. As such, in some implementations, the content generation and delivery architecture 100 of a component thereof (e.g., the MSG 120 in FIG. 1A) is configured to detect a transition from a first reference rate to a second reference rate (e.g., an increase or decrease to the reference rate) and, in response thereto, dynamically update the synchronization signals to smoothly transition from the first reference rate to the second reference rate.

Figure 4B:
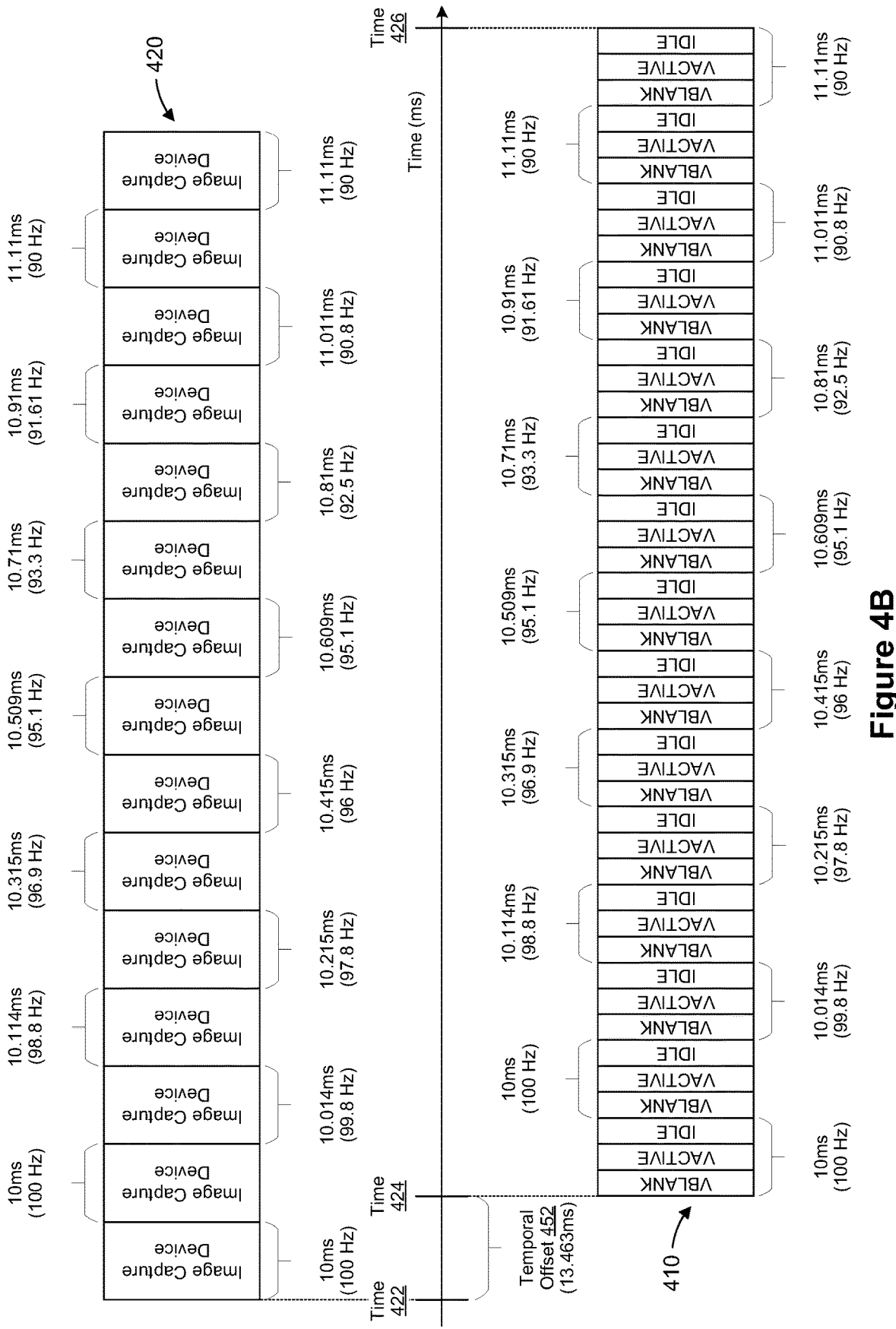
FIG. 4B illustrates an example temporal offset between the start of a sequence of image capture intervals relative to a start of the sequence of display-related intervals in FIG. 4A in accordance with some implementations.

FIG. 4B illustrates an example temporal offset between the start of a sequence of image capture-related intervals 420 relative to a start of the sequence of display-related intervals 410 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as one example, the content generation and delivery architecture 100 in FIG. 1A or a component thereof (e.g., the transition logic 122) detects a transition from a first reference rate (e.g., 100 Hz display refresh or frame rate) to a second reference rate (e.g., 90 Hz display refresh or frame rate). Continuing with this example, in response to detecting the transition in the reference rate, the content generation and delivery architecture 100 in FIG. 1A or a component thereof (e.g., the transition logic 122) causes the display pipeline 146 and/or the display device 148 to operate according to the sequence of display-related intervals 410 and also causes the image capture device 142 to operate according to the sequence of image capture-related intervals 420.

For example, with reference to FIG. 4B, the content generation and delivery architecture 100 in FIG. 1A or a component thereof (e.g., the transition logic 122) decreases the clock frequency of the display pipeline 146 and/or the display device 148 by approximately 0.9 to 1.0 Hz per interval over the sequence of display-related intervals 410. Similarly, with continued reference to FIG. 4B, the content generation and delivery architecture 100 in FIG. 1A or a component thereof (e.g., the transition logic 122) decreases the clock frequency of the image capture device 142 by approximately 0.9 to 1.0 Hz per interval over the sequence of image capture-related intervals 420. In FIG. 4B, the transition from the first reference rate to the second reference rate is complete at time 426 (e.g., when the sequence of display-related intervals 410 ends). However, as shown in FIG. 4B, a start time 424 for the sequence of display-related intervals 410 is delayed by the temporal offset 452 relative to a start time 422 for the sequence of image capture-related intervals 420.

Figure 5A:
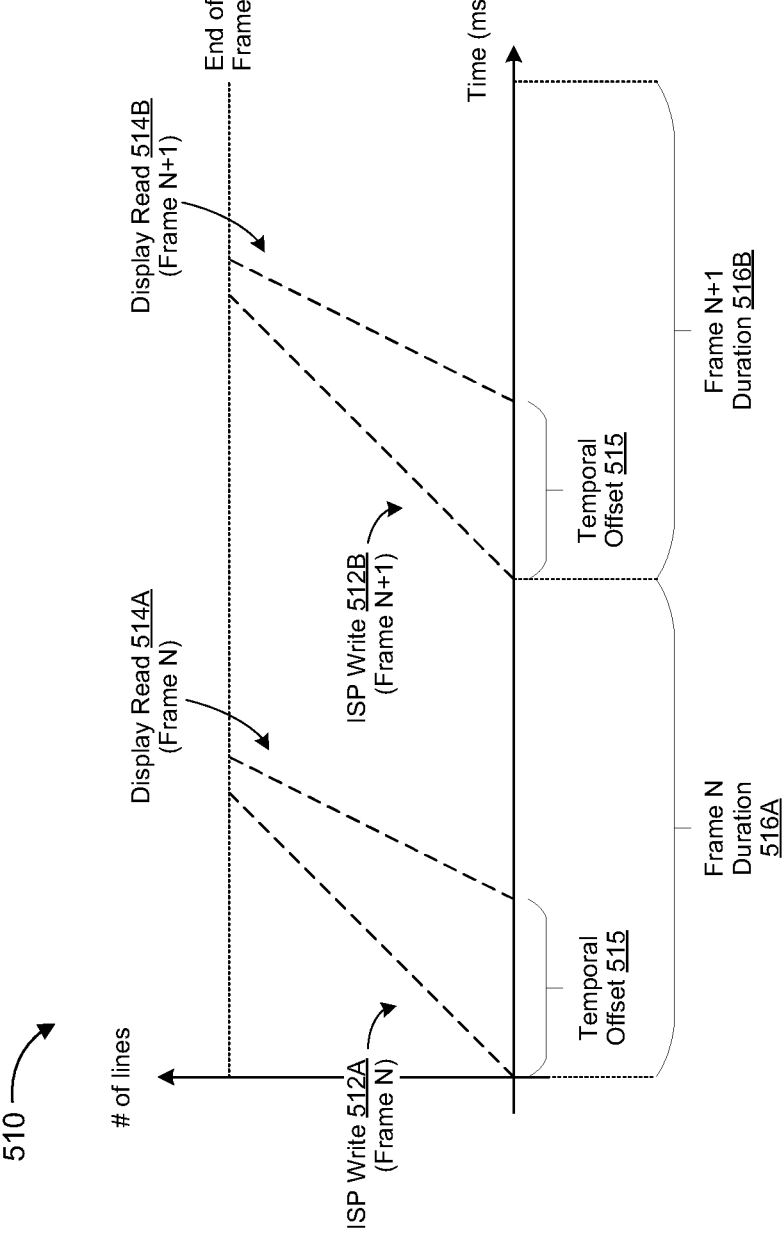
FIG. 5A-5C illustrate various timing diagrams with different temporal offsets in accordance with some implementations.
Figure 5B:
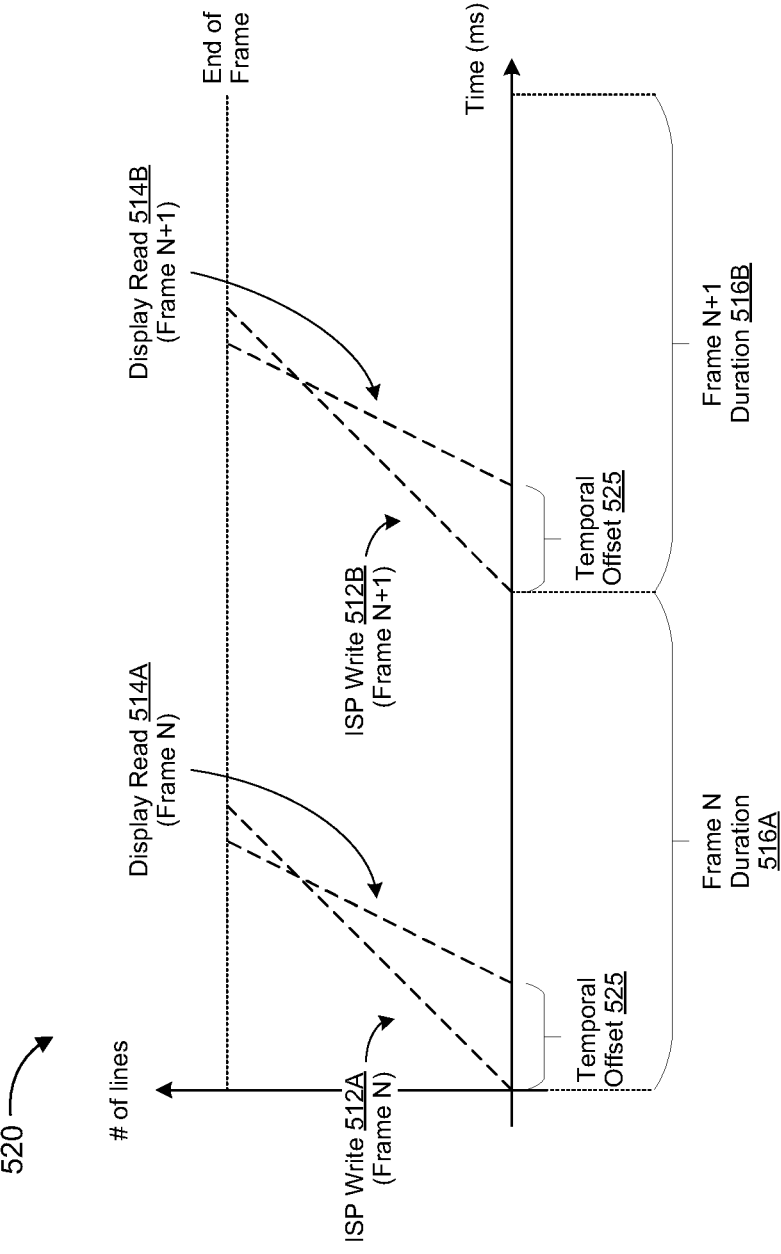
Figure 5C:
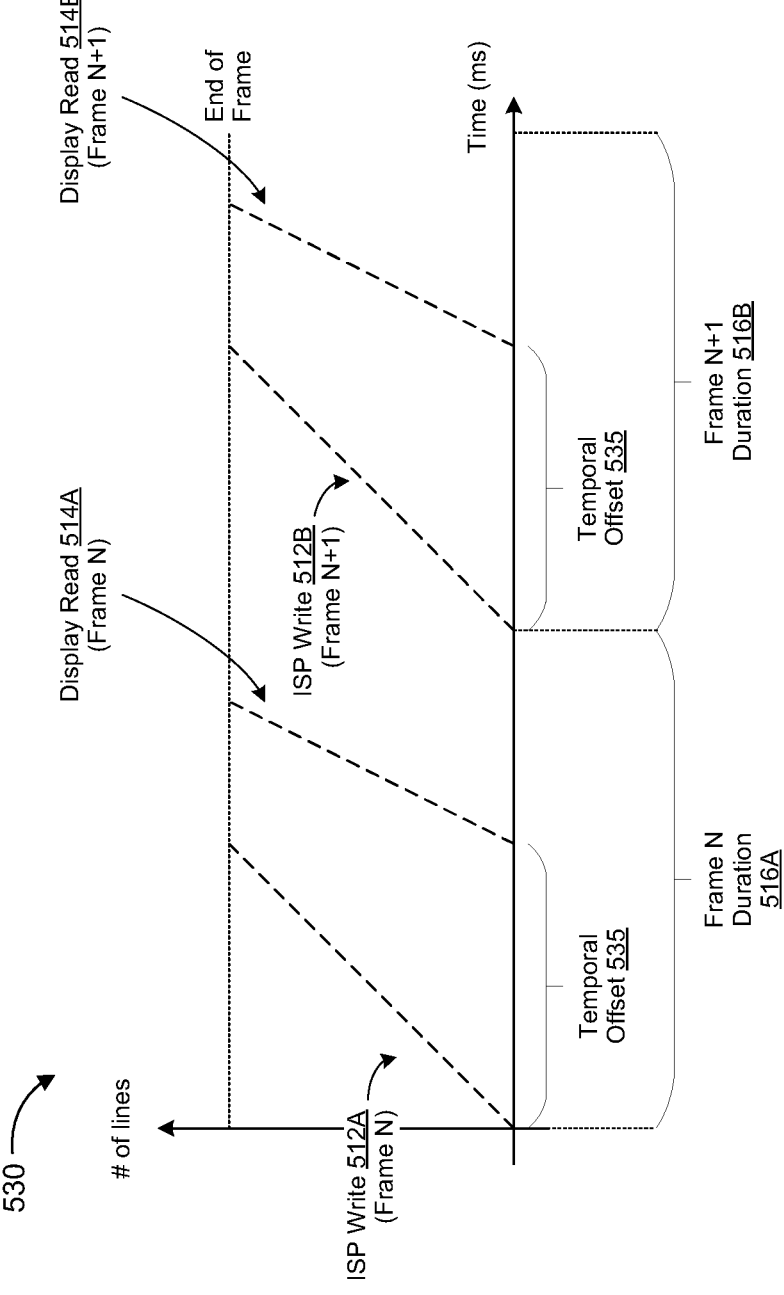

FIGS. 5A-5C illustrate various timing diagrams 510, 520, and 530 with different temporal offsets 515, 525, and 535, respectively, in accordance with some implementations. FIG. 5A illustrates an example timing diagram 510 with a temporal offset 515 in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIG. 5A, an ISP write operation 512A for frame N starts at time 0 (e.g., the beginning of the frame N duration 516A), and a display read operation 514A for frame N starts after a temporal offset 515 relative to the start of the ISP write operation 512A for frame N. For example, the ISP write operation 512A for frame N corresponds to the ISP pipeline 144 writing the processed image associated with frame N to the partial frame buffer 145 in FIG. 1A. For example, the display read operation 514A for frame N corresponds to the display pipeline 146 reading the processed image associated with frame N from the partial frame buffer 145 in FIG. 1A.

Similarly, in FIG. 5A, an ISP write operation 512B for frame N+1 starts at after the end of the frame N duration 516A (e.g., the beginning of the frame N+1 duration 516B), and a display read operation 514B for frame N+1 starts after the temporal offset 515 relative to the start of the ISP write operation 512B for frame N+1. As shown in FIG. 5A, the content generation and delivery architecture 100 in FIG. 1A determines the temporal offset 515 such that the display read operation does not catch up to the ISP write operation while reducing the size of the partial frame buffer 145 allocated by the buffer allocator 260 in FIG. 2B.

FIG. 5B illustrates another example timing diagram 520 with a temporal offset 525 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the timing diagram 520 in FIG. 5B is similar to and adapted from the timing diagram 510 in FIG. 5A. To that end, similar reference numbers are used in FIGS. 5A and 5B and only the differences therebetween will be discussed for the sake of brevity.

For example, the temporal offset 525 in FIG. 5B is less than the temporal offset 515 in FIG. 5A. As a result, the display read operation 514A for frame N finishes prior to the ISP write operation 512A for frame N. In this example, a hardware failure may occur when the display pipeline 146 exhausts the lines written to the partial frame buffer 145 by the ISP pipeline 144.

FIG. 5C illustrates another example timing diagram 530 with a temporal offset 535 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the timing diagram 530 in FIG. 5C is similar to and adapted from the timing diagram 510 in FIG. 5A. To that end, similar reference numbers are used in FIGS. 5A and 5C and only the differences therebetween will be discussed for the sake of brevity.

For example, the temporal offset 535 in FIG. 5C is greater than the temporal offset 515 in FIG. 5A. As a result, the photon-to-photon latency is longer as compared to FIG. 5A, and the ISP write operation 512A for frame N finishes significantly earlier than the display read operation 514A for frame N. In this example, the buffer allocator 260 in FIG. 2B may allocate more memory for the partial frame buffer 145 relative to the timing diagram 530 in FIG. 5C as compared to the timing diagram 510 in FIG. 5A because the display read operation does not consume the lines in the partial frame buffer 145 as fast as in FIG. 5A due to the temporal offset 535 being greater than the temporal offset 515. As such, the photon-to-photon latency and the buffer size are greater in FIG. 5C as opposed to FIG. 5A due to the temporal offset 535 being greater than the temporal offset 515. In some implementations, the content generation and delivery architecture determines/selects the temporal offset in order to reduce the photon-to-photon latency and also to reduce the size of the partial frame buffer while not exhausting the partial frame buffer as discussed above.

FIG. 6 is a flowchart representation of a method 600 of synchronizing a content generation and delivery architecture to reduce the latency associated with image passthrough in accordance with some implementations. In various implementations, the method 600 is performed by a computing system including: a content generation and delivery architecture including an image capture device, an image signal processing (ISP) pipeline, a partial frame buffer, a display pipeline, and a display device; synchronization circuitry (e.g., the MSG 120 in FIG. 1); one or more processors; and a non-transitory memory (e.g., the computing system 700 in FIG. 7). In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

In some implementations, the image capture device includes a single image sensor. In some implementations, the image capture device includes a plurality of image sensors. In some implementations, the display device includes a single display device. In some implementations, the display device includes a plurality of display devices.

As represented by block 602, the method 600 includes determining a temporal offset associated with the content generation and delivery architecture to reduce a photon-to-photon latency across the content generation and delivery architecture. For example, with reference to FIG. 1A, the content generation and delivery architecture 100 or a component thereof (e.g., the MSG 120) determines/selects the temporal offset 112 in order to reduce the photon-to-photon latency 210 described above with reference to FIG. 2A and also to reduce the memory footprint of the partial frame buffer 145. With reference to FIG. 5A, the computing system or a component thereof (e.g., the MSG 120 in FIG. 1A) determines/selects the temporal offset 515 in order to reduce a photon-to-photon latency across the content generation and delivery architecture and also to reduce the memory footprint of the partial frame buffer 145. With reference to FIG. 5B, the temporal offset 525 is too short, which may cause a hardware failure when the display pipeline 146 exhausts the lines written to the partial frame buffer 145 by the ISP pipeline 144. With reference to FIG. 5C, the temporal offset 535 is too long, which causes a longer photon-to-photon latency and a larger memory footprint for the partial frame buffer 145 as opposed to the temporal offset 515 in FIG. 5A.

In some implementations, the temporal offset also includes a jitter delay. In some implementations, the temporal offset also includes deterministic or non-deterministic temporal padding. For example, as shown in FIG. 2A, the temporal offset 112 includes the photon-to-photon latency 210, the jitter delay 212, and miscellaneous temporal padding 214.

As represented by block 604, the method 600 includes obtaining a first reference rate associated with a portion of the content generation and delivery architecture. For example, with reference to FIG. 1A, the content generation and delivery architecture 100 or a component thereof (e.g., the MSG 120) obtains (e.g., receives, retrieves, determines, etc.) the reference rate 114. As one example, with reference to FIG. 1A, the first reference rate corresponds to the current refresh or frame rate of the display device 148 in a display-centric regime. As another example, with reference to FIG. 1A, the first reference rate corresponds to the current shutter speed or image capture rate of the image capture device 142 in an image capture-centric regime.

As represented by block 606, the method 600 includes generating, via the synchronization circuitry, a synchronization signal for the content generation and delivery architecture based at least in part on the first reference rate. For example, with reference to FIG. 1A, the content generation and delivery architecture 100 or a component thereof (e.g., the MSG 120) obtains (e.g., receives, retrieves, determines, generates, etc.) the synchronization signals 132 and 136 based at least in part on the reference rate 114.

In some implementations, the MSG 120 generates a same synchronization signal that is provided to all portions of the content generation and delivery architecture. For example, the synchronization signal includes the reference rate 114 and the temporal offset 112. In some implementations, the MSG 120 derives different synchronization signals for each portion of the content generation and delivery architecture based on the reference rate and adjustable timing-related parameters (e.g., intrinsic parameters) associated with each portion of the content generation and delivery architecture. As one example, the adjustable timing-related parameters associated with the image capture device include the shutter speed, exposure length, and/or the like. As another example, the adjustable timing-related parameters associated with the display pipeline 146 and/or the display device 148 include the IDLE period described above with reference to FIG. 4A.

As represented by block 608, the method 600 includes operating the content generation and delivery architecture according to the synchronization signal and the temporal offset. For example, with reference to FIG. 1A, the content generation and delivery architecture 100 or a component thereof (e.g., the MSG 120) provides the synchronization signals 132 and 136 to the image capture device 142 and the display pipeline 146, respectively.

In some implementations, operating the content generation and delivery architecture includes: obtaining an input image of a physical environment from the image capture device according to the synchronization signal; generating, via the ISP pipeline, a processed image by performing one or more image processing operations on the input image; writing, via the ISP pipeline, the processed image to the partial frame buffer; reading, via the display pipeline, the processed image from the partial frame buffer according to the synchronization signal; generating, via the display pipeline, a composited image by compositing rendered virtual content with the processed image; and in response to determining that the temporal offset has elapsed, presenting, via the display device, the composited image or other content.

For example, with reference to FIG. 1A, the content generation and delivery architecture 100 or a component thereof (e.g., the image capture device 142) obtains an input image of the physical environment 105 according to the synchronization signal 132. With continued reference to FIG. 1A, the content generation and delivery architecture 100 or a component thereof (e.g., the ISP pipeline 144) generates a processed image by performing one or more image processing operations on the input image and writes the processed image to the partial frame buffer. With continued reference to FIG. 1A, the content generation and delivery architecture 100 or a component thereof (e.g., the display pipeline 146) reads the processed image from the partial frame buffer according to the synchronization signal 136 and generates a composited image by compositing rendered virtual content with the processed image. With continued reference to FIG. 1A, the content generation and delivery architecture 100 or a component thereof (e.g., the display device 148) presents the composited image or other content.

In some implementations, the one or more image processing operations include at least one of a white balance operation, a debayering operation, a noise reduction operation, a color correction operation, a gamma correction operation, and a sharpening operation. For example, FIG. 1B illustrates a plurality of image processing operations 174 to 184 associated with the ISP pipeline 144.

According to some implementations, the method 600 includes: determining a size value for the partial frame buffer based on the reference rate and intrinsic parameters of the display device; and allocating memory for the partial frame buffer based on the size value. For example, the intrinsic parameters of the display device include display resolution, aspect ratio, and/or the like. For example, with reference to FIG. 2B, the buffer allocator 260 determines an allocation value 262 (e.g., a size value for the memory footprint of the partial frame buffer 145) based on the reference rate 114, the exposure length associated with the image capture device 142, the image capture device readout latency 204 as shown in FIG. 2A, the ISP pipeline latency 205 as shown in FIG. 2A, software jitter, a resolution value associated with the display device 148, one or more downstream perspective correction operations performed by the content generation and delivery architecture 100 in FIG. 1A, one or more image processing operations (e.g., warping operations to account for various factors such as chromatic aberration from a lens associated with the display device 148, calibration of the image capture device 142, gaze direction of a user, and/or the like) performed by the content generation and delivery architecture 100 in FIG. 1A, and/or the like. Furthermore, in some implementations, in response to detecting a change in the reference rate 114 from a first reference rate to a second reference rate, the buffer allocator 260 determines an updated allocation value 262 based at least in part on the second reference rate.

According to some implementations, as represented by block 610, the method 600 includes: detecting a change from the first reference rate to a second reference rate; and in response to detecting the change from the first reference rate to the second reference rate, generating an updated synchronization signal for the content generation and delivery architecture based at least in part on the second reference rate. For example, with reference to FIG. 1A, the content generation and delivery architecture 100 or a component thereof (e.g., the transition logic 122) detects a change in the reference rate 114 from a first reference rate to a second reference rate. As one example, the reference rate 114 increases from 90 Hz to 100 Hz. As another example, the reference rate 114 decreases from 100 Hz to 90 Hz.

In some implementations, as represented by block 612, the change from the first reference rate to the second reference rate corresponds to a change from a first application to a second application different from the first application. For example, with reference to FIG. 1A, the content generation and delivery architecture 100 or a component thereof (e.g., the transition logic 122) detects a transition from a productivity application to a content consumption application, or vice versa.

In some implementations, as represented by block 614, the change from the first reference rate to the second reference rate corresponds to a change from a first user state to a second user state different from the first user state. For example, with reference to FIG. 1A, the content generation and delivery architecture 100 or a component thereof (e.g., the transition logic 122) detects a transition from a sitting state to a standing state, or vice versa, based on motion sensor data from at least one of an inertial measurement unit (IMU), an accelerometer, a gyroscope, a magnetometer, or the like of the computing system.

In some implementations, as represented by block 616, the change from the first reference rate to the second reference rate corresponds to a change from a first environment state to a second environment state different from the first environment state. For example, with reference to FIG. 1A, the content generation and delivery architecture 100 or a component thereof (e.g., the transition logic 122) detects a transition from an indoor environment to an outdoor environment, or vice versa, based on location data. For example, with reference to FIG. 1A, the content generation and delivery architecture 100 or a component thereof (e.g., the transition logic 122) detects a transition from a bright environment to a dim environment, or vice versa, based on an ambient light value from an ambient light sensor of the computing system. For example, with reference to FIG. 1A, the content generation and delivery architecture 100 or a component thereof (e.g., the transition logic 122) detects a transition from a high frequency environment to a low frequency environment, or vice versa, based on characterization data or image processing data associated with the physical environment 105.

Figure 7:
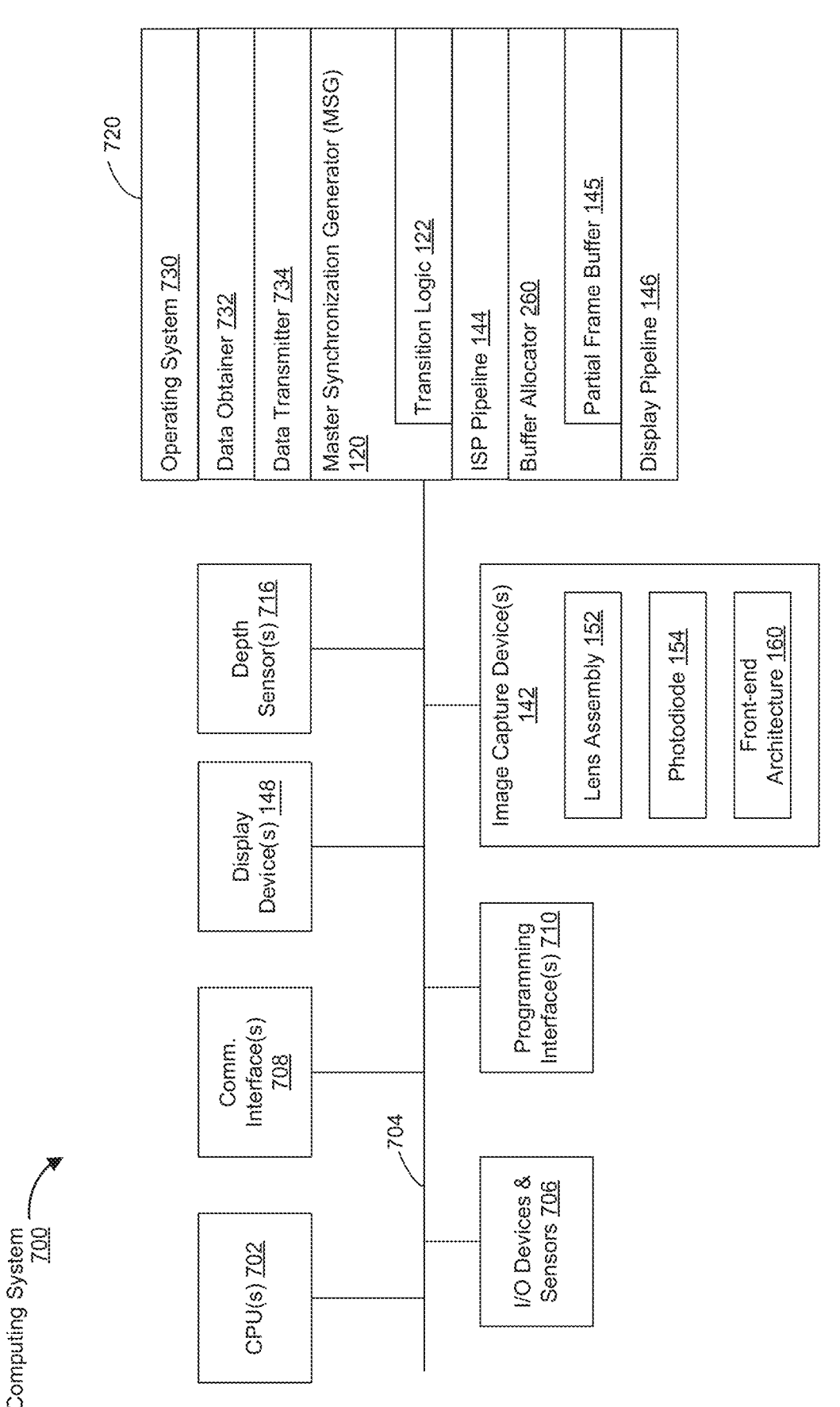
FIG. 7 is a block diagram of an example computing system in accordance with some implementations.

FIG. 7 is a block diagram of an example of a computing system 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing system 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 710, one or more display devices 148, one or more image capture devices 142, one or more depth sensors 716, a memory 720, and one or more communication buses 704 for interconnecting these and various other components. In various implementations, the computing system 700 includes the content generation and delivery architecture 100 described with reference to FIG. 1A. In some implementations, the computing system 700 provides the functionality of the content generation and delivery architecture 100 in FIG. 1A.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, an ambient light sensor, one or more environmental sensors, and/or the like.

In some implementations, the one or more display devices 148 are configured to provide the user interface or the XR experience to the user. In some implementations, the one or more display devices 146 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more display devices 148 correspond to diffractive, reflective, polarized, holographic, etc. waveguide displays.

In some implementations, the one or more image capture devices 142 include the lens assembly 152, the photodiode 154, and the front-end architecture 160 as shown in FIG. 1B. The one or more image capture devices 142 may include one or more RGB cameras (e.g., with a complimentary metal-oxide-semiconductor CMOS image sensor or a CCD image sensor), one or more infrared (IR) cameras, one or more event-based cameras, and/or the like. In some implementations, the one or more depth sensors 716 correspond to a structured light device, a time-of-flight device, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof.

The operating system 730 includes procedures for handling various basic system services and for performing hardware dependent tasks.

In some implementations, the data obtainer 732 is configured to obtain data (e.g., image data, presentation data, interaction data, sensor data, location data, etc.) from at least the one or more I/O devices and sensors 706, the one or more image capture devices 142, the one or more depth sensors 716, or the like. To that end, in various implementations, the data obtainer 732 includes instructions and/or logic therefor, and heuristics and metadata therefor.

In some implementations, the data transmitter 734 is configured to transmit data (e.g., image data, sensor data, presentation data, location data, etc.) to a local or remote recipient. To that end, in various implementations, the data transmitter 734 includes instructions and/or logic therefor, and heuristics and metadata therefor.

In some implementations, the MSG 120 is configured to determine/select the temporal offset 112 in order to reduce the photon-to-photon latency 210 described above with reference to FIG. 2A and also to reduce the memory footprint of the partial frame buffer 145. In some implementations, the MSG 120 is also configured to generate a synchronization signal based on a reference rate and the temporal offset. The MSG 120 is described in more detail above with reference to FIG. 1A. In some implementations, the MSG 120 includes transition logic 122 for handling a change in the reference rate. To that end, in various implementations, the MSG 120 includes instructions and/or logic therefor, and heuristics and metadata therefor.

In some implementations, the ISP pipeline 144 is configured to obtain an input image from the one or more image capture devices 142 and generate a processed image by performing one or more image processing operations on the input image. In some implementations, the ISP pipeline 144 is also configured to write the processed image to the partial frame buffer 145. The ISP pipeline 144 is described in more detail above with reference to FIG. 1B. To that end, in various implementations, the ISP pipeline 144 includes instructions and/or logic therefor, and heuristics and metadata therefor.

In some implementations, the buffer allocator 260 is configured to determine a size value for the partial frame buffer 145 and allocate memory for the partial frame buffer 145 based on the size value. The buffer allocator 260 is described in more detail above with reference to FIG. 2B. To that end, in various implementations, the buffer allocator 260 includes instructions and/or logic therefor, and heuristics and metadata therefor.

In some implementations, the display pipeline 146 is configured to read the processed image from the partial frame buffer. In some implementations, the display pipeline 146 is also configured to generate a composited image by compositing the processed image frame with rendered virtual content. The display pipeline 146 is described in more detail above with reference to FIG. 1C. To that end, in various implementations, the display pipeline 146 includes instructions and/or logic therefor, and heuristics and metadata therefor.

In some implementations, the computing system 700 corresponds to a wearable computing device, a wearable computing device, a head-mounted system, or the like. Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 8A is a flowchart representation of a method 800 of synchronizing a content generation and delivery architecture to reduce the latency associated with image passthrough in accordance with some implementations. In various implementations, the method 800 is performed by an electronic device including: an image capture device; a display device; a communication interface for communicating with a controller that includes synchronization circuitry (e.g., the MSG 120 in FIG. 1), an image signal processing (ISP) pipeline, and a display pipeline; one or more processors; and a non-transitory memory (e.g., the electronic device 900 in FIG. 9). In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

In some implementations, the image capture device includes a single image sensor. In some implementations, the image capture device includes a plurality of image sensors. In some implementations, the display device includes a single display device. In some implementations, the display device includes a plurality of display devices.

As represented by block 802, the method 800 includes transmitting a reference rate associated with the display device to the server via the communication interface. For example, with reference to FIG. 9, the electronic device 900 transmits the reference rate to the controller 950 via the one or more communication interfaces 908.

As represented by block 804, the method 800 includes obtaining a temporal offset to reduce a photon-to-photon latency associated with an amount of time between image capture by the image capture device and image presentation by the display device. In some implementations, the temporal offset also reduces the memory footprint of the partial frame buffer 145. For example, with reference to FIG. 9, the electronic device 900 obtains the temporal offset, for example, from the controller 950 via the one or more communication interfaces 908.

In some implementations, the temporal offset also includes a jitter delay. In some implementations, the temporal offset includes deterministic or non-deterministic temporal padding. For example, as shown in FIG. 2A, the temporal offset 112 includes the photon-to-photon latency 210, the jitter delay 212, and miscellaneous temporal padding 214.

As represented by block 806, the method 800 includes obtaining a synchronization signal associated with the reference rate from the MSG via the communication interface for synchronizing the image capture device and the display device with the ISP pipeline and the display pipeline. For example, with reference to FIG. 9, the electronic device 900 obtains the synchronization signal from the controller 950 via the one or more communication interfaces 908.

As represented by block 808, the method 800 includes obtaining, via the image capture device, an input image of a physical environment according to the synchronization signal. For example, with reference to FIG. 9, the electronic device 900 obtains the input image from the one or more image capture devices 142.

As represented by block 810, the method 800 includes transmitting the input image to the ISP pipeline via the communication interface. For example, with reference to FIG. 9, the electronic device 900 transmits the input image to the controller 950 via the one or more communication interfaces 908.

As represented by block 812, the method 800 includes obtaining a composited image from the display pipeline via the communication interface, wherein the composited image includes rendered virtual content composited with a representation of the input image. For example, with reference to FIG. 9, the electronic device 900 obtains the processed image from the controller 950 via the one or more communication interfaces 908.

As represented by block 814, in response to determining that the temporal offset has elapsed, the method 800 includes presenting, via the display device, the composited image. For example, with reference to FIG. 9, the one or more display devices 148 of the electronic device 900 present the composited image after the temporal offset elapses.

According to some implementations, the method 800 includes: detecting a change from the first reference rate to a second reference rate; in response to detecting the change from the first reference rate to the second reference rate, transmitting the second reference rate to the controller via the communication interface; and obtaining an updated synchronization signal based at least in part on the second reference rate from the MSG via the communication interface. For example, with reference to FIG. 9, the electronic device 900 detects a change in the reference rate 114 from a first reference rate to a second reference rate and transmits the second reference rate to the controller 950 via the one or more communication interfaces 908. Continuing with this example, the electronic device 900 obtains the updated synchronization signal from the controller 950 via the one or more communication interfaces 908. As one example, the reference rate 114 increases from 90 Hz to 100 Hz. As another example, the reference rate 114 decreases from 100 Hz to 90 Hz.

In some implementations, the change from the first reference rate to the second reference rate corresponds to a change from a first application to a second application different from the first application. For example, with reference to FIG. 9, the electronic device 900 detects a transition from a productivity application to a content consumption application, or vice versa.

In some implementations, the change from the first reference rate to the second reference rate corresponds to a change from a first user state to a second user state different from the first user state. For example, with reference to FIG. 9, the electronic device 900 detects a transition from sitting to standing, or vice versa, based on motion data from the one or more I/O devices and sensors 906.

In some implementations, the change from the first reference rate to the second reference rate corresponds to a change from a first environment state to a second environment state different from the first environment state. As one example, with reference to FIG. 9, the electronic device 900 detects a transition from an indoor environment to an outdoor environment, or vice versa. As another example, with reference to FIG. 9, the electronic device 900 detects a transition from a bright environment to a dim environment, or vice versa, based on ambient light values from the one or more I/O devices and sensors 906. As yet another example, example, with reference to FIG. 9, the electronic device 900 detects a transition from a high frequency environment to a low frequency environment, or vice versa, based on a frequency value associated with the input images of the physical environment 105 from the one or more image capture devices 142.

FIGS. 8B and 8C illustrate a flowchart representation of a method 850 of synchronizing a content generation and delivery architecture to reduce the latency associated with image passthrough in accordance with some implementations. In various implementations, the method 850 is performed by a controller including: synchronization circuitry (e.g., the MSG 120 in FIG. 1); a partial frame buffer; an image signal processing (ISP) pipeline; a display pipeline; a communication interface for communicating with an electronic device that includes an image capture device and a display device; one or more processors; and a non-transitory memory (e.g., the controller 950 in FIG. 9). In some implementations, the method 850 is performed by processing logic, including hardware, firmware, software, or a combination thereof. In some implementations, the method 850 is performed by a processor executing code stored in a non-transitory computer-readable medium (e.g., a memory). In various implementations, some operations in method 850 are, optionally, combined and/or the order of some operations is, optionally, changed.

As represented by block 852, the method 850 includes obtaining a reference rate associated with the display device from the electronic device via the communication interface. For example, with reference to FIG. 9, the controller 950 obtains the reference rate from the electronic device 900 via the one or more communication interfaces 958.

As represented by block 854, the method 850 includes determining a temporal offset to reduce a photon-to-photon latency associated with an amount of time between image capture by the image capture device and image presentation by the display device. According to some implementations, the MSG 120 determines/selects the temporal offset 112 in order to reduce the photon-to-photon latency 210 described above with reference to FIG. 2A and also to reduce the memory footprint of the partial frame buffer 145. For example, with reference to FIG. 9, the controller 950 determines/selects the temporal offset.

As represented by block 856, the method 850 includes determining a synchronization signal based on the reference rate for synchronizing the image capture device and the display device with the ISP pipeline and the display pipeline. For example, with reference to FIG. 9, the controller 950 or a component thereof (e.g., the MSG 120) determines the synchronization signal.

As represented by block 858, the method 850 includes transmitting the synchronization signal to the electronic device via the communication interface. For example, with reference to FIG. 9, the controller 950 transmits the synchronization signal to the electronic device 900 via the one or more communication interfaces 958.

Figure 9:
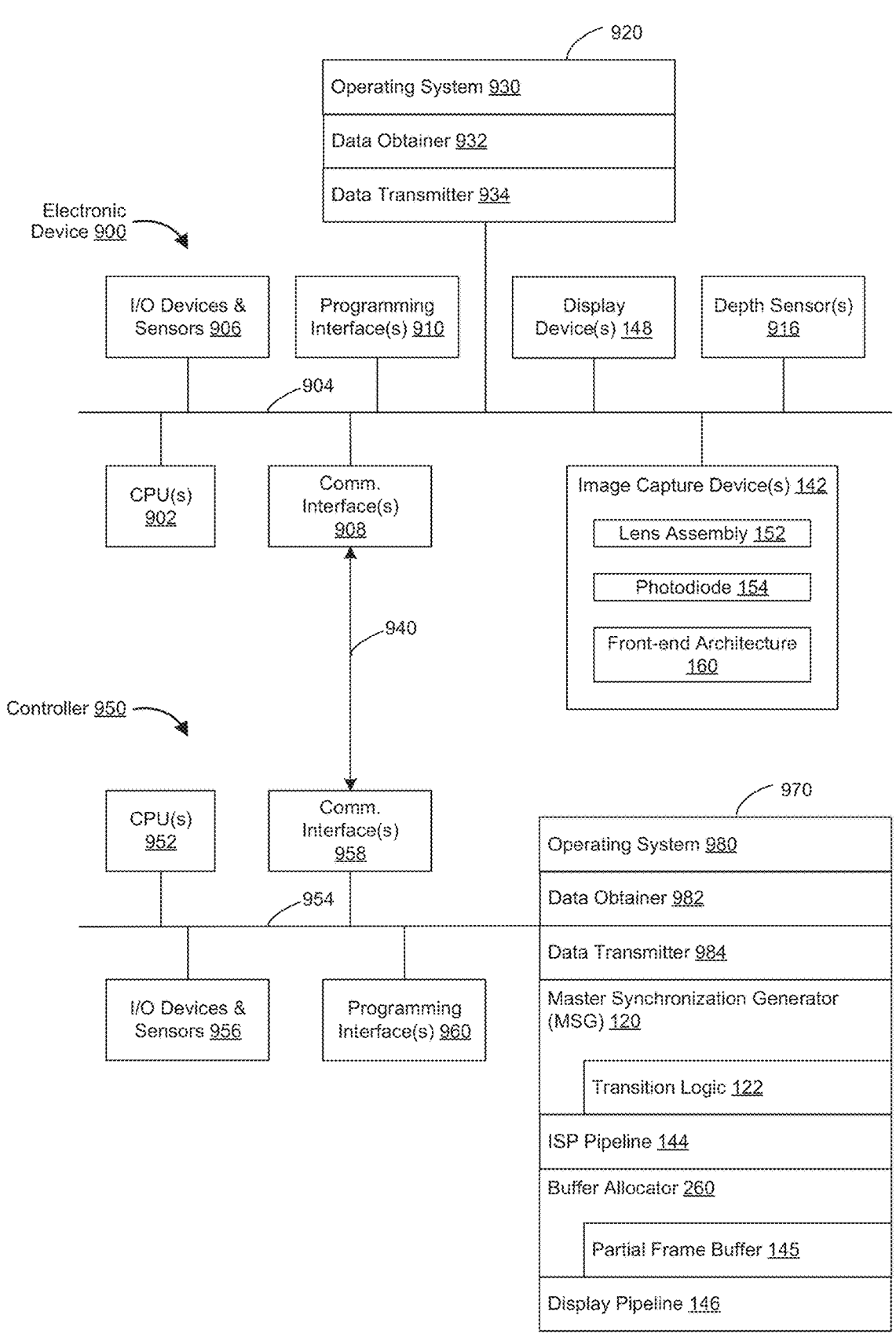
FIG. 9 illustrates block diagrams of an example controller and an example electronic device in accordance with some implementations.

As represented by block 860, the method 850 includes obtaining an input image of a physical environment according to the synchronization signal from the image capture device via the communication interface. example, with reference to FIG. 9, the controller 950 obtains the input image from the electronic device 900 via the one or more communication interfaces 958.

As represented by block 862, the method 850 includes generating, via the ISP pipeline, a processed image by performing one or more image processing operations on the input image. For example, with reference to FIG. 9, the controller 950 or a component thereof (e.g., the ISP pipeline 144) generates the processed image by performing one or more image processing operations on the input image. In some implementations, the one or more image processing operations include at least one of a white balance operation, a debayering operation, a noise reduction operation, a color correction operation, a gamma correction operation, and a sharpening operation. For example, FIG. 1B illustrates a plurality of image processing operations 174 to 184 associated with the ISP pipeline 144.

As represented by block 864, the method 850 includes writing, via the ISP pipeline, the processed image to the partial frame buffer. For example, with reference to FIG. 9, the controller 950 or a component thereof (e.g., the ISP pipeline 144) writes the processed image to the partial frame buffer 145.

As represented by block 866, the method 850 includes reading, via the display pipeline, the processed image from the partial frame buffer according to the synchronization signal. For example, with reference to FIG. 9, the controller 950 or a component thereof (e.g., the display pipeline 146) reads the processed image from the partial frame buffer 145 according to the synchronization signal.

As represented by block 868, the method 850 includes generating, via the display pipeline, a composited image by compositing rendered virtual content with the processed image. For example, with reference to FIG. 9, the controller 950 or a component thereof (e.g., the display pipeline 146) generates the composited image by compositing rendered virtual content with the processed image. The display pipeline 146 is described in more detail above with reference to FIG. 1C.

As represented by block 866, the method 850 includes transmitting the composited image to the display device via the communication interface. For example, with reference to FIG. 9, the controller 950 transmits the composited image to the electronic device 900 via the one or more communication interfaces 958.

FIG. 9 is a block diagram of an example of an electronic device 900 and a controller 950 in accordance with some implementations. In some implementations, the electronic device 900 and the controller 950, alone or in combination, provide the functionality of the content generation and delivery architecture 100 in FIG. 1A. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 910, one or more display devices 148, one or more image capture devices 142, one or more depth sensors 916, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, an ambient light sensor, one or more environmental sensors, and/or the like.

In some implementations, the one or more display devices 148 are configured to provide the user interface or the XR experience to the user. In some implementations, the one or more display devices 146 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more display devices 148 correspond to diffractive, reflective, polarized, holographic, etc. waveguide displays.

In some implementations, the one or more image capture devices 142 include the lens assembly 152, the photodiode 154, and the front-end architecture 160 as shown in FIG. 1B. The one or more image capture devices 142 may include one or more RGB cameras (e.g., with a CMOS image sensor or a CCD image sensor), one or more infrared (IR) cameras, one or more event-based cameras, and/or the like. In some implementations, the one or more depth sensors 916 correspond to a structured light device, a time-of-flight device, and/or the like.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof.

The operating system 930 includes procedures for handling various basic system services and for performing hardware dependent tasks.

In some implementations, the data obtainer 932 is configured to obtain data (e.g., synchronization signals, image data, presentation data, interaction data, sensor data, location data, etc.) from at least the one or more I/O devices and sensors 906, the one or more image capture devices 142, the one or more depth sensors 916, the controller 950 via the one or more communication interfaces 908, or the like. To that end, in various implementations, the data obtainer 932 includes instructions and/or logic therefor, and heuristics and metadata therefor.

In some implementations, the data transmitter 934 is configured to transmit data (e.g., image data, sensor data, presentation data, location data, etc.) to the controller 950 via the one or more communication interfaces 908. To that end, in various implementations, the data transmitter 934 includes instructions and/or logic therefor, and heuristics and metadata therefor.

As shown in FIG. 9, the electronic device 900 and the controller 950 are communicatively coupled via a wireless or wired communication channel 940. In some implementations, the electronic device 900 corresponds to a wearable computing device, a head-mounted display, a head-mounted system, a tablet, a smartphone, or the like. In some implementations, the controller 950 corresponds to a local or remote server, a cloud server, a laptop, a tablet, a smartphone, a wearable computing device, or the like.

In FIG. 9, the controller 950 includes one or more processing units 952 (e.g., microprocessors, ASICs, FPGAs, GPUs, CPUs, processing cores, and/or the like), one or more input/output (I/O) devices and sensors 956, one or more communication interfaces 958 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 960, a memory 970, and one or more communication buses 954 for interconnecting these and various other components.

In some implementations, the one or more communication buses 954 include circuitry that interconnects and controls communications between system components. In some implementations, the one or more I/O devices and sensors 956 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

The memory 970 includes high-speed random-access memory, such as DRAM, SRAM, DDR RAM, or other random-access solid-state memory devices. In some implementations, the memory 970 includes non-volatile memory, such as one or more magnetic disk storage devices, optical disk storage devices, flash memory devices, or other non-volatile solid-state storage devices. The memory 970 optionally includes one or more storage devices remotely located from the one or more processing units 952. The memory 970 comprises a non-transitory computer readable storage medium. In some implementations, the memory 970 or the non-transitory computer readable storage medium of the memory 970 stores the following programs, modules and data structures, or a subset thereof.

The operating system 980 includes procedures for handling various basic system services and for performing hardware dependent tasks.

In some implementations, the data obtainer 982 is configured to obtain data (e.g., image data, presentation data, interaction data, sensor data, location data, etc.) from at least the one or more I/O devices and sensors 956, the one or more image capture devices 142, the one or more depth sensors 916, the electronic device 900 via the one or more communication interfaces 958, or the like. To that end, in various implementations, the data obtainer 982 includes instructions and/or logic therefor, and heuristics and metadata therefor.

In some implementations, the data transmitter 984 is configured to transmit data (e.g., synchronization signals, image data, sensor data, presentation data, location data, etc.) to the electronic device 900 via the one or more communication interfaces 958. To that end, in various implementations, the data transmitter 984 includes instructions and/or logic therefor, and heuristics and metadata therefor.

In some implementations, the MSG 120 is configured to determine/select the temporal offset 112 in order to reduce the photon-to-photon latency 210 described above with reference to FIG. 2A and also to reduce the memory footprint of the partial frame buffer 145. In some implementations, the MSG 120 is also configured to generate a synchronization signal based on a reference rate and the temporal offset. The MSG 120 is described in more detail above with reference to FIG. 1A. In some implementations, the MSG 120 includes transition logic 122 for handling a change in the reference rate. To that end, in various implementations, the MSG 120 includes instructions and/or logic therefor, and heuristics and metadata therefor.

In some implementations, the ISP pipeline 144 is configured to obtain an input image from the one or more image capture devices 142 and generate a processed image by performing one or more image processing operations on the input mage. In some implementations, the ISP pipeline 144 is also configured to write the processed image to the partial frame buffer 145. The ISP pipeline 144 is described in more detail above with reference to FIG. 1B. To that end, in various implementations, the ISP pipeline 144 includes instructions and/or logic therefor, and heuristics and metadata therefor.

In some implementations, the buffer allocator 260 is configured to determine a size value for the partial frame buffer 145 and allocate memory for the partial frame buffer 145 based on the size value. The buffer allocator 260 is described in more detail above with reference to FIG. 2B. To that end, in various implementations, the buffer allocator 260 includes instructions and/or logic therefor, and heuristics and metadata therefor.

In some implementations, the display pipeline 146 is configured to read the processed image from the partial frame buffer. In some implementations, the display pipeline 146 is also configured to generate a composited image by compositing the processed image frame with rendered virtual content. The display pipeline 146 is described in more detail above with reference to FIG. 1C. To that end, in various implementations, the display pipeline 146 includes instructions and/or logic therefor, and heuristics and metadata therefor.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A computing system comprising:

a content generation and delivery architecture including an image capture device, an image signal processing (ISP) pipeline, a partial frame buffer, a display pipeline, and a display device;

synchronization circuitry;

one or more processors;

a non-transitory memory; and one or more programs stored in the non-transitory memory, which, when executed by the one or more processors, cause the computing system to:

determine a temporal offset associated with the content generation and delivery architecture to reduce a photon-to-photon latency across the content generation and delivery architecture;

obtain a first reference rate associated with a portion of the content generation and delivery architecture;

generate, via the synchronization circuitry, a synchronization signal for the content generation and delivery architecture based at least in part on the first reference rate;

operate the content generation and delivery architecture according to the synchronization signal and the temporal offset;

detect a change from the first reference rate to a second reference rate; and in response to detecting the change from the first reference rate to the second reference rate, generate an updated synchronization signal for the content generation and delivery architecture based at least in part on the second reference rate, wherein the change from the first reference rate to the second reference rate corresponds to a change from a first application to a second application different from the first application, a change from a first user state to a second user state different from the first user state, or a change from a first environment state to a second environment state different from the first environment state.

2. The computing system of claim 1, wherein operating the content generation and delivery architecture includes:

obtaining an input image of a physical environment from the image capture device according to the synchronization signal;

generating, via the ISP pipeline, a processed image by performing one or more image processing operations on the input image;

writing, via the ISP pipeline, the processed image to the partial frame buffer according to the synchronization signal;

reading, via the display pipeline, the processed image from the partial frame buffer according to the synchronization signal;

generating, via the display pipeline, a composited image by compositing rendered virtual content with the processed image; and in response to determining that the temporal offset has elapsed, presenting, via the display device, the composited image according to the synchronization signal.

3. The computing system of claim 2, wherein the one or more image processing operations include at least one of a white balance operation, a debayering operation, a noise reduction operation, a color correction operation, a gamma correction operation, and a sharpening operation.

4. The computing system of claim 1, wherein the one or more programs further cause the computing system to:

determine a size value for the partial frame buffer based on the reference rate and intrinsic parameters of the display device; and allocate memory for the partial frame buffer based on the size value.

5. The computing system of claim 1, wherein generating the synchronization signal for the content generation and delivery architecture includes generating a same synchronization signal for all portions of the content generation and delivery architecture based at least in part on the first reference rate.

6. The computing system of claim 1, wherein generating the synchronization signal for the content generation and delivery architecture includes generating a different synchronization signals for each portion of the content generation and delivery architecture based at least in part on the first reference rate and adjustable timing-related parameters associated with each portion of the content generation and delivery architecture.

7. The computing system of claim 1, wherein the temporal offset includes a jitter delay.

8. The computing system of claim 1, wherein the temporal offset includes deterministic or non-deterministic temporal padding.

9. The computing system of claim 1, wherein the image capture device includes a plurality of image sensors.

10. The computing system of claim 1, wherein the display device includes a plurality of display devices.

11. A method comprising:

at a computing system including non-transitory memory and one or more processors, synchronization circuitry, and a content generation and delivery architecture including an image capture device, an image signal processing (ISP) pipeline, a partial frame buffer, a display pipeline, and a display device:

determining a temporal offset associated with the content generation and delivery architecture to reduce a photon-to-photon latency across the content generation and delivery architecture;

obtaining a first reference rate associated with a portion of the content generation and delivery architecture;

generating, via the synchronization circuitry, a synchronization signal for the content generation and delivery architecture based at least in part on the first reference rate, including generating a different synchronization signal for each portion of the content generation and delivery architecture based at least in part on the first reference rate and adjustable timing-related parameters associated with each portion of the content generation and delivery architecture; and operating the content generation and delivery architecture according to the synchronization signal and the temporal offset.

12. The method of claim 11, wherein operating the content generation and delivery architecture includes:

obtaining an input image of a physical environment from the image capture device according to the synchronization signal;

generating, via the ISP pipeline, a processed image by performing one or more image processing operations on the input image;

writing, via the ISP pipeline, the processed image to the partial frame buffer according to the synchronization signal;

reading, via the display pipeline, the processed image from the partial frame buffer according to the synchronization signal;

generating, via the display pipeline, a composited image by compositing rendered virtual content with the processed image; and in response to determining that the temporal offset has elapsed, presenting, via the display device, the composited image according to the synchronization signal.

13. The method of claim 12, wherein the one or more image processing operations include at least one of a white balance operation, a debayering operation, a noise reduction operation, a color correction operation, a gamma correction operation, and a sharpening operation.

14. The method of claim 11, further comprising:

determining a size value for the partial frame buffer based on the reference rate and intrinsic parameters of the display device; and allocating memory for the partial frame buffer based on the size value.

15. The method of claim 11, further comprising:

detecting a change from the first reference rate to a second reference rate; and in response to detecting the change from the first reference rate to the second reference rate, generating an updated synchronization signal for the content generation and delivery architecture based at least in part on the second reference rate.

16. The method of claim 15, wherein the change from the first reference rate to the second reference rate corresponds to a change from a first application to a second application different from the first application.

17. The method of claim 15, wherein the change from the first reference rate to the second reference rate corresponds to a change from a first user state to a second user state different from the first user state.

18. The method of claim 15, wherein the change from the first reference rate to the second reference rate corresponds to a change from a first environment state to a second environment state different from the first environment state.

19. A non-transitory memory storing one or more programs, which, when executed by one or more processors of a computing system with synchronization circuitry and a content generation and delivery architecture including an image capture device, an image signal processing (ISP) pipeline, a partial frame buffer, a display pipeline, and a display device, cause the computing system to:

determine a temporal offset associated with the content generation and delivery architecture to reduce a photon-to-photon latency across the content generation and delivery architecture, wherein the temporal offset includes one or more of a jitter delay and deterministic or non-deterministic temporal padding;

obtain a first reference rate associated with a portion of the content generation and delivery architecture;

generate, via the synchronization circuitry, a synchronization signal for the content generation and delivery architecture based at least in part on the first reference rate; and operate the content generation and delivery architecture according to the synchronization signal and the temporal offset.

20. The non-transitory memory of claim 19, wherein the one or more programs further cause the computing system to:

detect a change from the first reference rate to a second reference rate; and in response to detecting the change from the first reference rate to the second reference rate, generate an updated synchronization signal for the content generation and delivery architecture based at least in part on the second reference rate.

21. The non-transitory memory of claim 20, wherein the change from the first reference rate to the second reference rate corresponds to a change from a first application to a second application different from the first application, a change from a first user state to a second user state different from the first user state, or a change from a first environment state to a second environment state different from the first environment state.

22. The non-transitory memory of claim 19, wherein generating the synchronization signal for the content generation and delivery architecture includes generating a same synchronization signal for all portions of the content generation and delivery architecture based at least in part on the first reference rate.

23. The non-transitory memory of claim 19, wherein generating the synchronization signal for the content generation and delivery architecture includes generating a different synchronization signals for each portion of the content generation and delivery architecture based at least in part on the first reference rate and adjustable timing-related parameters associated with each portion of the content generation and delivery architecture.

* * * * *